US009195775B2

(12) United States Patent
Al-Shaykh et al.

(10) Patent No.: US 9,195,775 B2
(45) Date of Patent: Nov. 24, 2015

(54) SYSTEM AND METHOD FOR MANAGING AND/OR RENDERING INTERNET MULTIMEDIA CONTENT IN A NETWORK

(75) Inventors: Osama Al-Shaykh, San Diego, CA (US); Rick Schwartz, Carlsbad, CA (US); Ralph Neff, San Diego, CA (US); Magdalena Leuca Espelien, San Diego, CA (US); Greg Sherwood, Inverness, IL (US)

(73) Assignee: III Holdings 2, LLC, Wilmington, DE (US)

( * ) Notice: Subject to any disclaimer, the term of this patent is extended or adjusted under 35 U.S.C. 154(b) by 1541 days.

(21) Appl. No.: 12/459,090

(22) Filed: Jun. 26, 2009

(65) Prior Publication Data
US 2010/0332565 A1  Dec. 30, 2010

(51) Int. Cl.
*G06F 17/30* (2006.01)
*H04N 7/16* (2011.01)
*H04N 21/41* (2011.01)
*H04N 21/436* (2011.01)
*H04N 21/4402* (2011.01)
*H04N 21/4627* (2011.01)
*H04N 21/472* (2011.01)
*H04N 21/482* (2011.01)
(Continued)

(52) U.S. Cl.
CPC ........ *G06F 17/30905* (2013.01); *H04L 12/281* (2013.01); *H04L 12/2809* (2013.01); *H04L 12/2836* (2013.01); *H04N 7/163* (2013.01); *H04N 21/4122* (2013.01); *H04N 21/43615* (2013.01); *H04N 21/4402* (2013.01); *H04N 21/4627* (2013.01); *H04N 21/47202* (2013.01); *H04N 21/482* (2013.01); *H04N 21/6125* (2013.01); *H04N 21/6582* (2013.01); *H04L 65/4084* (2013.01); *H04L 2012/2849* (2013.01)

(58) Field of Classification Search
USPC ...................................... 725/86, 93
See application file for complete search history.

(56) References Cited

U.S. PATENT DOCUMENTS 5,790,848 A  8/1998 Wlaschin
5,819,047 A  10/1998 Bauer et al.
(Continued)

FOREIGN PATENT DOCUMENTS

JP  2003288286  10/2003
JP  2006209541  8/2006
(Continued)

OTHER PUBLICATIONS

PCT Written Opinion Aug. 5, 2010.
(Continued)

*Primary Examiner* — Kim Nguyen
(74) *Attorney, Agent, or Firm* — McAndrews, Held & Malloy, Ltd.

(57) ABSTRACT

A system and a method render internet multimedia content in a network using an application to render the internet multimedia content and/or locally stored multimedia content on one or more rendering devices in the network. The application may provide web browser functions, such as, for example, receiving, processing, decoding and/or rendering the internet multimedia content. The application may have an enhanced user interface which may enable a user to select the internet multimedia content and a rendering device in the network, send the internet multimedia content to the rendering device and/or control rendering of the internet multimedia content on the rendering device.

11 Claims, 5 Drawing Sheets

(51) Int. Cl.
*H04N 21/61* (2011.01)
*H04N 21/658* (2011.01)
*H04L 12/28* (2006.01)
*H04L 29/06* (2006.01)

(56) References Cited

U.S. PATENT DOCUMENTS

| | | | |
|---|---|---|---|
| 5,862,325 A | 1/1999 | Reed et al. | |
| 6,141,682 A | 10/2000 | Barker | |
| 6,161,132 A | 12/2000 | Roberts et al. | |
| 6,167,092 A | 12/2000 | Lengwehasatit | |
| 6,175,856 B1 | 1/2001 | Riddle | |
| 6,182,287 B1 | 1/2001 | Schneidewend et al. | |
| 6,304,969 B1 | 10/2001 | Wasserman et al. | |
| 6,356,971 B1 | 3/2002 | Katz et al. | |
| 6,407,680 B1 | 6/2002 | Lai et al. | |
| 6,429,812 B1 | 8/2002 | Hoffberg | |
| 6,498,865 B1 | 12/2002 | Brailean et al. | |
| 6,529,552 B1 | 3/2003 | Tsai et al. | |
| 6,647,269 B2 | 11/2003 | Hendrey et al. | |
| 6,742,028 B1 | 5/2004 | Wang et al. | |
| 6,804,717 B1 | 10/2004 | Bakshi et al. | |
| 6,865,600 B1 | 3/2005 | Brydon et al. | |
| 6,941,324 B2 | 9/2005 | Plastina et al. | |
| 7,006,631 B1 | 2/2006 | Luttrell | |
| 7,013,149 B2 | 3/2006 | Vetro | |
| 7,080,400 B1* | 7/2006 | Navar | 725/139 |
| 7,139,279 B2 | 11/2006 | Jabri et al. | |
| 7,493,106 B2 | 2/2009 | Espelien | |
| 2002/0002044 A1 | 1/2002 | Naruse et al. | |
| 2002/0129359 A1 | 9/2002 | Lichner | |
| 2002/0131496 A1 | 9/2002 | Vasudevan et al. | |
| 2002/0181495 A1 | 12/2002 | Requena et al. | |
| 2003/0009518 A1 | 1/2003 | Harrow et al. | |
| 2003/0040962 A1* | 2/2003 | Lewis | 705/14 |
| 2003/0048855 A1 | 3/2003 | Klaghofer et al. | |
| 2003/0067872 A1 | 4/2003 | Harrell et al. | |
| 2003/0078061 A1 | 4/2003 | Kim | |
| 2003/0093267 A1 | 5/2003 | Leichtling et al. | |
| 2003/0115069 A1 | 6/2003 | Pence et al. | |
| 2003/0115150 A1 | 6/2003 | Hamilton et al. | |
| 2003/0140343 A1 | 7/2003 | Falvo et al. | |
| 2003/0142744 A1 | 7/2003 | Wu et al. | |
| 2003/0142751 A1 | 7/2003 | Hannuksela | |
| 2003/0229900 A1 | 12/2003 | Reisman | |
| 2003/0233399 A1 | 12/2003 | Prohel et al. | |
| 2004/0068536 A1 | 4/2004 | Demers et al. | |
| 2004/0070678 A1 | 4/2004 | Toyama et al. | |
| 2004/0077313 A1 | 4/2004 | Oba et al. | |
| 2004/0088369 A1 | 5/2004 | Yeager | |
| 2004/0116067 A1 | 6/2004 | Karaoguz et al. | |
| 2004/0158645 A1 | 8/2004 | Morinaga et al. | |
| 2004/0172478 A1 | 9/2004 | Jacobs et al. | |
| 2004/0174817 A1 | 9/2004 | Jabri et al. | |
| 2004/0193762 A1 | 9/2004 | Leon et al. | |
| 2004/0210935 A1 | 10/2004 | Schein et al. | |
| 2004/0218673 A1 | 11/2004 | Wang et al. | |
| 2004/0255029 A1 | 12/2004 | Manion et al. | |
| 2004/0255336 A1* | 12/2004 | Logan et al. | 725/135 |
| 2004/0268386 A1* | 12/2004 | Logan et al. | 725/34 |
| 2005/0008030 A1 | 1/2005 | Hoffmann et al. | |
| 2005/0028208 A1 | 2/2005 | Ellis et al. | |
| 2005/0047448 A1 | 3/2005 | Lee et al. | |
| 2005/0095981 A1 | 5/2005 | Benco | |
| 2005/0097595 A1 | 5/2005 | Lipsanen et al. | |
| 2005/0144641 A1* | 6/2005 | Lewis | 725/60 |
| 2005/0228830 A1 | 10/2005 | Plastina et al. | |
| 2006/0008256 A1 | 1/2006 | Khedouri et al. | |
| 2006/0010472 A1 | 1/2006 | Godeny | |
| 2006/0013148 A1 | 1/2006 | Burman et al. | |
| 2006/0029041 A1 | 2/2006 | Jabri et al. | |
| 2006/0031883 A1 | 2/2006 | Ellis et al. | |
| 2006/0053080 A1 | 3/2006 | Edmonson et al. | |
| 2006/0056336 A1 | 3/2006 | Dacosta | |
| 2006/0056416 A1 | 3/2006 | Yang et al. | |
| 2006/0095792 A1 | 5/2006 | Hurtado et al. | |
| 2006/0117379 A1 | 6/2006 | Bennett et al. | |
| 2006/0133391 A1 | 6/2006 | Kang et al. | |
| 2006/0159037 A1 | 7/2006 | Jabri et al. | |
| 2006/0161635 A1 | 7/2006 | Lamkin et al. | |
| 2006/0176877 A1 | 8/2006 | Jabri et al. | |
| 2006/0242325 A1 | 10/2006 | Ramaswamy et al. | |
| 2006/0259575 A1 | 11/2006 | Upendran et al. | |
| 2007/0011277 A1 | 1/2007 | Neff et al. | |
| 2007/0027808 A1 | 2/2007 | Dooley et al. | |
| 2007/0049333 A1 | 3/2007 | Jeong et al. | |
| 2007/0076711 A1 | 4/2007 | Shuster | |
| 2007/0076756 A1 | 4/2007 | Chan et al. | |
| 2007/0093275 A1 | 4/2007 | Bloebaum et al. | |
| 2007/0112935 A1 | 5/2007 | Espelien | |
| 2007/0116036 A1 | 5/2007 | Moore | |
| 2007/0130210 A1 | 6/2007 | Park | |
| 2007/0143806 A1 | 6/2007 | Pan | |
| 2007/0156770 A1 | 7/2007 | Espelien | |
| 2007/0157234 A1 | 7/2007 | Walker | |
| 2007/0162571 A1 | 7/2007 | Gupta et al. | |
| 2007/0186003 A1 | 8/2007 | Foster et al. | |
| 2007/0189275 A1 | 8/2007 | Neff | |
| 2007/0192810 A1* | 8/2007 | Pritchett et al. | 725/90 |
| 2007/0226315 A1 | 9/2007 | Espelien | |
| 2007/0233701 A1 | 10/2007 | Sherwood et al. | |
| 2007/0245399 A1 | 10/2007 | Espelien | |
| 2007/0266047 A1 | 11/2007 | Cortes et al. | |
| 2007/0276864 A1 | 11/2007 | Espelien | |
| 2007/0288478 A1 | 12/2007 | Dimaria et al. | |
| 2007/0297352 A1 | 12/2007 | Jabri et al. | |
| 2008/0021952 A1 | 1/2008 | Molinie et al. | |
| 2008/0027808 A1 | 1/2008 | Wilf | |
| 2008/0037489 A1 | 2/2008 | Yitiz et al. | |
| 2008/0039967 A1 | 2/2008 | Sherwood et al. | |
| 2008/0050096 A1 | 2/2008 | Ryu | |
| 2008/0090590 A1 | 4/2008 | Espelien | |
| 2008/0092054 A1 | 4/2008 | Bhumkar et al. | |
| 2008/0133759 A1* | 6/2008 | Weel | 709/227 |
| 2008/0154696 A1 | 6/2008 | Spiegelman et al. | |
| 2008/0301280 A1 | 12/2008 | Chasen et al. | |
| 2009/0052380 A1 | 2/2009 | Espelien | |
| 2009/0070344 A1 | 3/2009 | Espelien | |
| 2009/0083803 A1 | 3/2009 | Al-Shaykh et al. | |
| 2009/0156182 A1 | 6/2009 | Jenkins et al. | |
| 2009/0157680 A1 | 6/2009 | Crossley et al. | |
| 2009/0205003 A1 | 8/2009 | Benyamin | |
| 2009/0232220 A1 | 9/2009 | Neff et al. | |
| 2009/0248702 A1 | 10/2009 | Schwartz et al. | |
| 2010/0045705 A1* | 2/2010 | Vertegaal et al. | 345/661 |
| 2010/0095332 A1* | 4/2010 | Gran et al. | 725/93 |
| 2010/0162328 A1* | 6/2010 | Karaoguz et al. | 725/80 |

FOREIGN PATENT DOCUMENTS

| | | |
|---|---|---|
| JP | 2009021933 | 1/2009 |
| JP | 2009504002 | 1/2009 |
| WO | WO 2010/151284 | 12/2010 |

OTHER PUBLICATIONS

PCT Search Report Aug. 5, 2010.

* cited by examiner

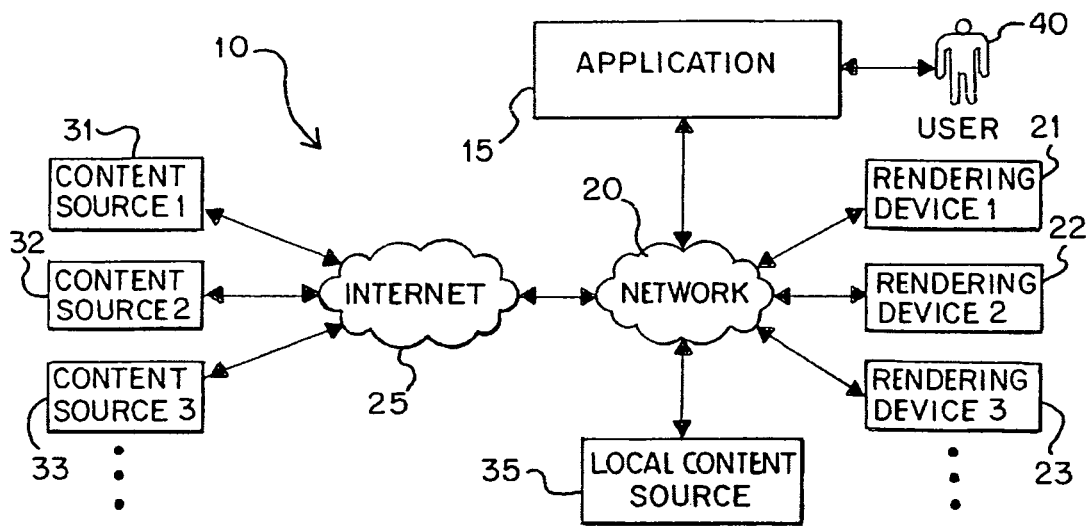
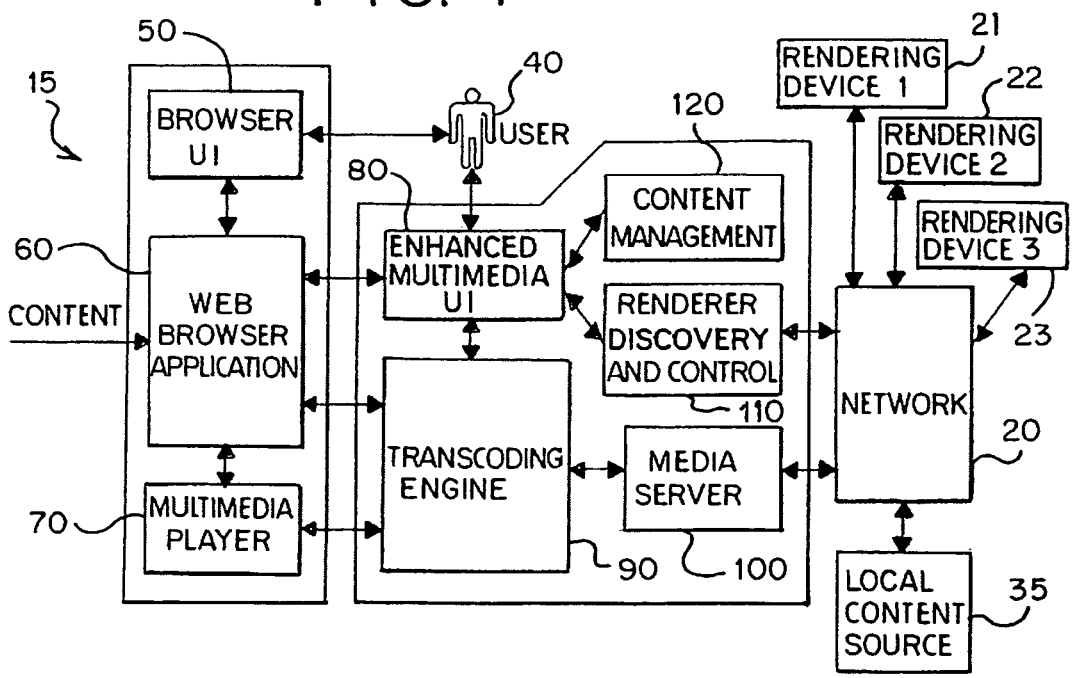

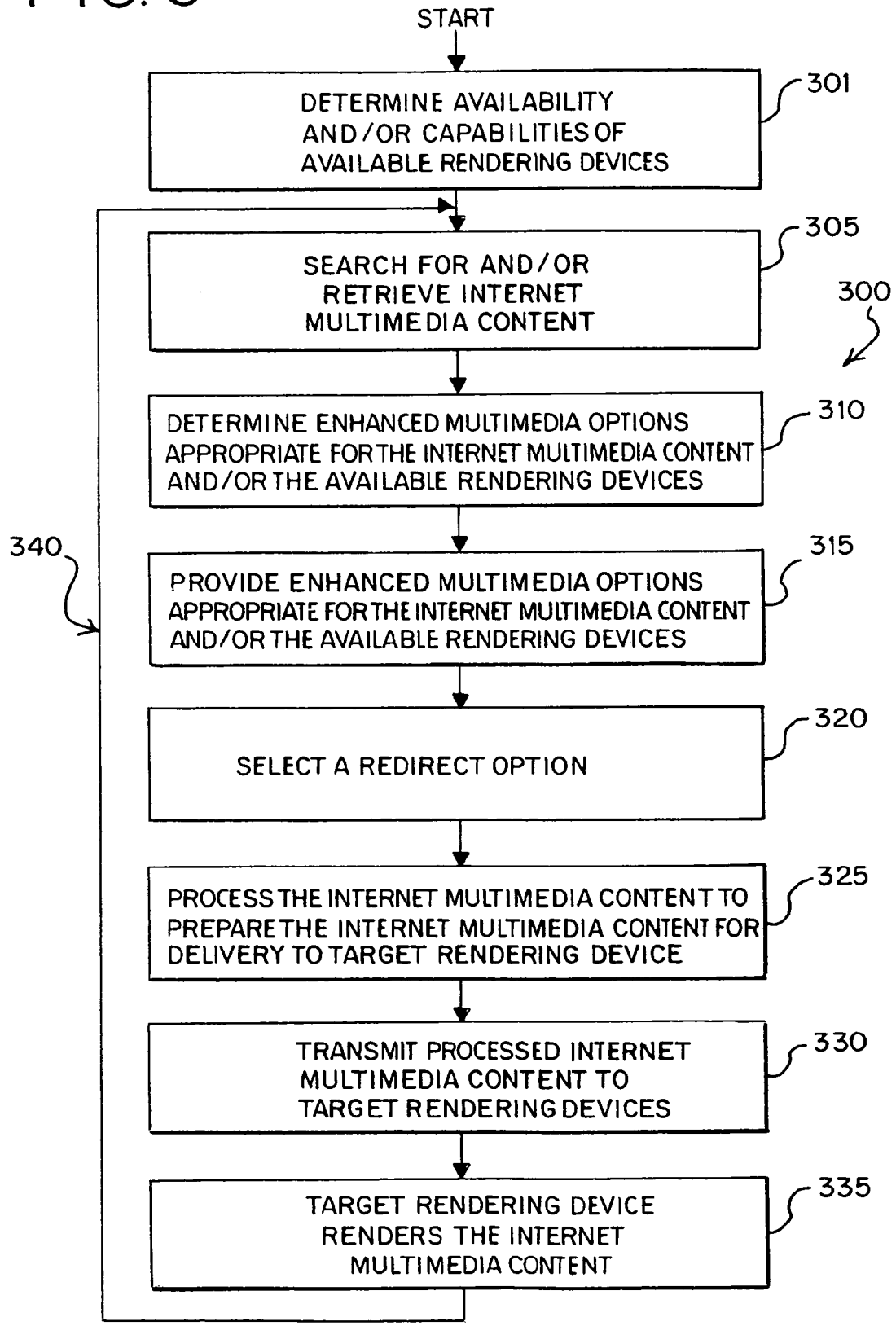

SYSTEM AND METHOD FOR MANAGING AND/OR RENDERING INTERNET MULTIMEDIA CONTENT IN A NETWORK

BACKGROUND OF THE INVENTION

The present invention generally relates to a system and a method for managing and/or rendering internet multimedia content in a network. More specifically, the present invention relates to a system and a method that utilize an application to render the internet multimedia content and locally stored multimedia content on one or more rendering devices in the network. The application may provide web browser functions, such as, for example, requesting, receiving, processing, decoding and/or rendering the internet multimedia content.

It is well known to use the internet to browse, find, retrieve and consume internet content using a web browser. Typically, the internet content may be a combination of webpage formatting, such as, for example, HTML, XHTML; text; graphics; active content and/or applications, such as, for example, Flash (trademark of Adobe System, Inc.) and/or JavaScript (trademark of Sun Microsystems, Inc.); and/or multimedia content. The multimedia content may be audio content, video content, image content and/or the like. The audio content may be audio files, audio podcasts, audio streams, internet radio channels, ringtones, midi files and/or the like. The video content may be video files, video podcasts, video streams, video channels and/or the like. The image content may be digital photographs, bitmap images, vector graphics images and/or the like.

Typically, the web browser may be an application provided by a computing device, such as, for example, a desktop computer, a laptop computer and/or a mobile device, such as a PDA and/or a mobile telephone. The web browser may access content sources using the internet as generally illustrated in FIG. 1. The internet content may be retrieved from the content sources using delivery protocols, such as, for example, Hypertext Transfer Protocol ("HTTP") and/or Real Time Streaming Protocol ("RTSP"). The web browser may accept input from the user to search for and/or select content of interest to the user. The web browser may retrieve the content of interest and may present the content of interest to the user for consumption. Presentation of the content of interest may require one or more associated helper applications, such as, for example, a multimedia player and/or a scripting engine.

Typically, the user may use the web browser to find and/or access a webpage of the internet content. The webpage of the internet content may be found using a search engine; by selecting a "bookmark" previously created by the user; by typing a content location identifier, such as, for example, a Uniform Resource Locator ("URL"); and/or by using other means. The webpage of the internet content may have and/or may provide multimedia content which may be decoded and/or may be rendered for the user. The video content may be displayed in an embedded video player which may render the video content in the webpage with associated webpage content and/or the formatting. Alternatively, the video content may be displayed in a separate video player which may appear on a separate webpage or in a separate window dedicated to the video player. Similarly, the image content may be displayed as embedded in the webpage or may be shown in a separate image viewer window. The audio content may be played by speakers and/or sent to an "audio out" port on the computing device.

FIG. 2 shows a typical prior art system in which the user interacts with the web browser using a web browser user interface ("UI") to find, retrieve and/or consume the internet content. The web browser UI may accept input from the user to navigate webpages and to discover and retrieve the internet content. The web browser UI may display and/or may render the internet content for the user. The web browser may use one or more multimedia players to process and render the multimedia content. The multimedia player may access the multimedia content using the web browser, as shown in FIG. 2, or the multimedia player may access the multimedia content using the internet without the multimedia content passing through the web browser.

Thus, the web browser may provide an interactive experience in which the user may find, retrieve and/or consume internet content, such as multimedia content. The web browser is currently the only means by which a user may access the complete collection of multimedia content available on the internet. However, the web browser is limited to rendering the internet content on the computing device which hosts the web browser.

The emergence of multimedia home networking technologies allows users to enjoy digital multimedia content on a variety of networked rendering devices in the home. The Universal Plug and Play (UPnP) Audio and Video (AV) standard defines a popular protocol by which media servers and media rendering devices may be connected, controlled and used to process and play multimedia content. The Digital Living Network Alliance (DLNA) specification provides additional details and conformance points to ensure UPnP AV-based home networking products correctly communicate with each other. Products based on the UPnP AV standard and/or the DLNA specification allow the user to access, control and render digital multimedia content files, such as, for example, audio files, video files, digital photographs and the like, within a multimedia-enabled home network.

Typically, the digital multimedia content files reside on one or more media servers in the home network. The digital multimedia content files may have been downloaded from the internet. For example, the user may have accessed an internet content store using the web browser to purchase and/or download the digital multimedia content files to one of the media servers in the home network. Alternatively, the digital multimedia content files may have been acquired without using the internet. For example, the user may have copied audio files from a CD or transferred video files from a camcorder and stored resulting audio and/or video files on one of the media servers in the home network. After the digital multimedia content files are stored on one of the media servers in the home network, user input may direct transmittal of the digital multimedia content files to one or more of the media rendering devices in the home network.

The home network may have various media rendering devices, such as, for example, networked stereos, televisions, personal computers, digital photo frames and other devices which have multimedia content rendering capabilities. The home network may also have control points which may be used to control the servers and the rendering devices so that the user may discover and/or may select from the digital multimedia content files and/or may control a rendering experience.

Thus, existing multimedia home networking technologies may enable selection, delivery and/or rendering of the digital multimedia content files which reside on the media servers in the home network. However, the digital multimedia content files must be downloaded and/or purchased by the user and must be placed on one of the media servers to be accessible to the rendering devices in the home network. Much of the multimedia content available on the internet was created for delivery to and/or display in a web browser and is typically not available in a downloadable form. Thus, the existing multimedia home networking technologies do not allow the user to access the complete collection of multimedia content available on the internet which has been created for delivery to and display within a web browser.

The user may have a media management and control application which enables the user to find, obtain, organize and play multimedia content. Typically, the media management and control application is provided by a personal computer or a laptop computer. For example, Twonky Media Manager (trademark of PacketVideo Corp.), SimpleCenter (trademark of Universal Electronics, Inc.) and iTunes (trademark of Apple Computer, Inc.) are media management and control applications provided by mobile devices. However, limited versions of a media management and control application may be provided by mobile devices, such as PDAs or mobile telephones.

The media management and control application may access an online content store to enable the user of the application to find, purchase and/or download multimedia content from the online content store. Thus, the application may allow the user to build a collection of multimedia content which may be played within the application, may be transferred to a mobile device and/or may be sent to one or more of the rendering devices in the home network. The application may act as a media server to transfer the multimedia content to the media rendering devices in the home network at the request of the user.

The media management and control application may have access to specific digital multimedia content files and/or multimedia content streams available from the internet. For example, the application may have the ability to relay internet radio channels. The user may select one of the internet radio channels. Then, the application may stream the selected internet radio channel from the internet to one or more of the rendering devices in the home network without storing the multimedia content on the media servers in the home network. The media management and control application may act as a media server and may reformat the content for compatibility with the target rendering device.

Therefore, media management and control applications may provide functions to obtain, purchase and/or organize multimedia content. The applications may also provide access to a limited subset of the multimedia content available on the internet. However, the applications do not have web browser functionality, and do not provide access to the complete collection of multimedia content available on the internet which has been created for delivery to and/or display within web browsers. Existing media management and control applications do not enable rendering of the complete collection of multimedia content available on the internet by the rendering devices in a home network.

An emerging class of consumer electronics device products known as bridge devices connect to the home network and to the rendering devices in the home to allow direct display of streamed internet multimedia content on one or more of the rendering devices. Typically, bridge devices do not access the rendering device using the home network. Instead, bridge devices have a wired audio and/or video connection which attaches directly to the rendering device. Thus, a bridge device is coupled directly to a single rendering device, and the rendering device does not need to be capable of connecting to the home network.

The bridge devices do not provide web browser functionality and, therefore, are not capable of providing access to the complete collection of multimedia content available on the internet. The bridge devices are designed to accommodate a specific subset of internet multimedia content, often from one or a few content sites. Restriction of the use of the bridge device to a few content sites enables the bridge device to be inexpensive and to have a relatively simple user interface. An example of a bridge device is a "Netflix Ready" device (trademark of Netflix, Inc.), such as the "Roku Digital Video Player" that allows the user to access Netflix "instant watch" videos from the internet and display them on a television. The "Netflix Ready" device must have an internet connection, and the user must have a valid Netflix subscription. However, the "Netflix Ready" device cannot browse internet multimedia content other than the Netflix "instant watch" videos. The "Netflix Ready" device also must be connected to the television using wired audio and video cables, and the "Netflix Ready" device cannot connect wirelessly to the television and cannot connect to a DLNA television using the home network.

Another example of bridge devices are some cable set-top boxes and digital video recorders (DVRs) that provide access to "YouTube" internet content (trademark of Google Inc.). For example, TiVo's HD DVR is an example of a bridge device which supports "YouTube" internet content. These bridge devices allow a subset of YouTube's internet video content to be viewed directly on a television using wired audio and video cables. The set-top box or DVR must have an internet connection, and a monthly subscription fee may be required. However, these bridge devices cannot browse general internet multimedia content and, therefore, cannot provide access to the complete collection of multimedia content available on the internet.

Existing web browsers are limited to rendering the internet multimedia content on the computing device which hosts the web browser. Existing multimedia home networking technologies and bridge devices enable rendering of multimedia content on rendering devices in the home network but do not allow the user to access the complete collection of multimedia content available on the internet. Therefore, existing multimedia technology does not enable consumption of the complete collection of multimedia content available on the internet on rendering devices in the home network.

SUMMARY OF THE INVENTION

The present invention generally relates to a system and a method for managing and/or rendering internet multimedia content in a network. More specifically, the present invention relates to a system and a method that utilize an application to render the internet multimedia content and/or locally stored multimedia content on one or more rendering devices in the network. The application may provide web browser functions, such as, for example, requesting, receiving, processing, decoding and/or rendering the internet multimedia content. The application may have an enhanced user interface which may enable a user to select the internet multimedia content and a rendering device in the home network, send the internet multimedia content to the rendering device and/or control rendering of the internet multimedia content on the rendering device.

To this end, in an embodiment of the present invention, a method for rendering internet multimedia content in a network connected to the internet is provided. A rendering device is connected to the network. The method has the steps of retrieving the internet multimedia content from the internet using the network wherein the internet multimedia content is retrieved from the internet based on user input accepted by a user interface provided by a device connected to the network and further wherein the user interface displays a webpage;

transmitting the internet multimedia content to the rendering device; and rendering the internet multimedia content on the rendering device wherein rendering by the rendering device is controlled by the device that provides the user interface.

In an embodiment, the method has the step of processing the internet multimedia content before transmitting the internet multimedia content to the rendering device wherein processing of the internet multimedia content is based on capabilities of the rendering device.

In an embodiment, the method has the step of displaying controls based on properties of the internet multimedia content wherein the controls are displayed in the user interface and further wherein the internet multimedia content is transmitted to the rendering device in response to selection of at least one of the controls.

In an embodiment, the method has the step of displaying controls based on capabilities of the rendering device wherein the controls are displayed in the user interface and further wherein the internet multimedia content is transmitted to the rendering device in response to selection of at least one of the controls.

In an embodiment, the method has the step of transmitting a first message to the rendering device wherein the rendering device transmits a second message in response to the first message and further wherein the second message requests transmittal of the internet multimedia content to the rendering device.

In an embodiment, the method has the step of retrieving a restriction associated with the internet multimedia content before transmitting the internet multimedia content to the rendering device wherein the internet multimedia content is transmitted to the rendering device if the restriction does not prohibit transmittal to the rendering device.

In an embodiment, the method has the step of displaying a list of rendering devices that indicates that the rendering device and an additional rendering device are capable of rendering the internet multimedia content and further wherein the internet multimedia content is transmitted to the rendering device in response to selection of the rendering device from the list.

In an embodiment, the method has the step of creating a playlist that has the internet multimedia content and multimedia content files stored in a server connected to the network wherein the internet multimedia content and the multimedia content files stored in the server are rendered in response to selection of the playlist.

In an embodiment, the method has the step of storing the internet multimedia content as a digital multimedia content file on a server connected to the network in response to user input accepted by the user interface.

In an embodiment, the method has the step of rendering the internet multimedia content in the user interface in substantial synchronization with rendering of the internet multimedia content by the rendering device.

In an embodiment, the method has the step of displaying a graphic representation of the rendering device wherein the internet multimedia content is transmitted to the rendering device in response to selection of the graphic representation.

In an embodiment, the method has the step of creating a bookmark for the internet multimedia content wherein a default rendering device connected to the network is associated with the bookmark and further wherein selection of the bookmark using the user interface initiates rendering of the internet multimedia content on the default rendering device.

In an embodiment, the internet multimedia content is provided by a first webpage and further wherein the rendering device continues to render the internet multimedia content after the user interface navigates from the first webpage to a second webpage that is a different webpage than the first webpage.

In an embodiment, the method has the step of transmitting advertising content associated with the internet multimedia content to the rendering device wherein the rendering device renders the advertising content.

In an embodiment, the method has the step of storing the internet multimedia content and advertising content associated with the internet multimedia content as a digital multimedia content file on a server connected to the network in response to user input accepted by the user interface.

In another embodiment of the present invention, a method for rendering internet multimedia content in a network connected to the internet is provided. A plurality of rendering devices are connected to the network and further wherein each of the plurality of rendering devices has rendering capabilities. The method has the steps of retrieving the internet multimedia content from the internet with a user interface provided on a device connected to the network wherein the internet multimedia content has properties and further wherein the user interface displays a webpage; identifying at least one rendering device of the plurality of rendering devices wherein the rendering capabilities of the at least one rendering device correspond to the properties of the internet multimedia content; displaying a first set of controls in the user interface wherein each of the at least one rendering device is associated with one of the first set of controls; accepting user input that identifies a selected control of the first set of controls wherein the user input determines a target rendering device and further wherein the target rendering device is one of the at least one rendering device which is associated with the selected control; transmitting the internet multimedia content to the target rendering device; and rendering the internet multimedia content on the target rendering device.

In an embodiment, the method has the step of reviewing a restriction associated with the internet multimedia content wherein the at least one rendering device conforms to the restriction.

In an embodiment, the method has the step of displaying a restriction associated with the internet multimedia content in the user interface wherein the internet multimedia content is transmitted to the target rendering device in response to user input after display of the restriction.

In an embodiment, the method has the step of displaying a second set of controls that control rendering of the internet multimedia content on the target rendering device.

In an embodiment, the method has the step of transmitting messages from the plurality of rendering devices wherein the messages indicate the rendering capabilities and further wherein the at least one rendering device is identified using the messages.

In another embodiment of the present invention, a system for rendering internet multimedia content in a network connected to the internet is provided. A rendering device is connected to the network. The system has a renderer control component that detects that the rendering device is connected to the network and further wherein the renderer control component determines capabilities of the rendering device; a user interface that presents control options for the internet multimedia content wherein the internet multimedia content is selected using a webpage associated with the internet multimedia content and further wherein the user interface is connected to the renderer control component wherein the control options are based on properties of the internet multimedia content and the capabilities of the rendering device and further wherein the user interface accepts user input selecting at least one of the control options; a transcoder that processes the internet multimedia content to generate processed internet multimedia content in response to the user input wherein the processed internet multimedia content is based on the capabilities of the rendering device; and a media server component that receives the processed internet multimedia content from the transcoder and transmits the processed internet multimedia content to the rendering device.

In an embodiment, the renderer control component, the user interface, the transcoder and the media server component are provided by a plug-in application that connects to a primary application executed by a device connected to the network and further wherein the primary application provides a web browser used to retrieve the webpage.

In an embodiment, the system has a web browser component connected to the user interface wherein the web browser component retrieves the webpage and further wherein the web browser component, the renderer control component, the user interface, the transcoder and the media server component are provided by an application executed by a device connected to the network.

In an embodiment, the system has a media player attached to the user interface wherein the media player, the renderer control component, the user interface, the transcoder and the media server component are provided by an application executed by a device connected to the network and further wherein the media player renders the internet multimedia content on. the device that provides the application.

In an embodiment, the system has a server accessible using the internet wherein the server provides a restriction for the internet multimedia content and further wherein the internet multimedia content is transmitted to the rendering device if transmittal to the rendering device complies with the restriction.

In an embodiment, the system has a first device connected to the network wherein the first device provides the renderer control component, the user interface, the transcoder and the media server component and further wherein the media server component indicates availability of the internet multimedia content to a second device connected to the network that is a different device than the first device.

In an embodiment, the system has a content management component connected to the user interface wherein the content management component creates a playlist that has the internet multimedia content and multimedia content files stored in a server connected to the network and further wherein the internet multimedia content and the multimedia content files stored in the server are rendered in response to selection of the playlist.

In an embodiment, the renderer control component acts as a UPnP AV Control Point.

In an embodiment, the transcoder generates the processed internet multimedia content to conform to a digital rights management protection associated with the internet multimedia content.

In an embodiment, the renderer control component transmits a first message to the first rendering device in response to the user input and further wherein the first rendering device transmits a second message to the media server component in response to the first message further wherein the second message requests transmittal of the processed internet multimedia content to the first rendering device.

It is, therefore, an advantage of the present invention to provide a system and a method for managing and/or rendering internet multimedia content in a network.

Another advantage of the present invention is to provide a system and a method for managing and/or rendering internet multimedia content in a network that enable rendering devices in the network to access the complete collection of internet multimedia content.

And, another advantage of the present invention is to provide a system and a method for managing and/or rendering internet multimedia content in a network that render the internet multimedia content in a home network without downloading the internet multimedia content to a media server in the home network.

Yet another advantage of the present invention is to provide a system and a method for managing and/or rendering internet multimedia content in a network that access the complete collection of the internet multimedia content using a web browser interface.

Still further, an advantage of the present invention is to provide a system and a method for managing and/or rendering internet multimedia content in a network that enable the user to send the internet multimedia content to any compatible rendering device in the network.

And, another advantage of the present invention is to provide a system and a method for managing and/or rendering internet multimedia content in a network that implement a user interface which combines web browsing tasks with the tasks of selecting, managing and controlling rendering devices in the network.

Yet another advantage of the present invention is to provide a system and a method for managing and/or rendering internet multimedia content in a network that organize and manage both the internet multimedia content and locally stored multimedia content to provide access to all multimedia content of interest to the user.

Still further, an advantage of the present invention is to provide a system and a method for managing and/or rendering internet multimedia content in a network that may be implemented as a "plug-in" to an existing web browser.

And, another advantage of the present invention is to provide a system and a method for managing and/or rendering internet multimedia content in a network that interpret and apply digital rights management technology for explicitly protected multimedia content.

Still further, an advantage of the present invention is to provide a system and a method for managing and/or rendering internet multimedia content in a network that detect, display and enforce terms of use associated with the internet multimedia content.

Another advantage of the present invention is to provide a system and a method for managing and/or rendering internet multimedia content in a network which detect advertising content associated with the internet multimedia content and/or ensure that the advertising content is displayed effectively and/or appropriately in the network.

Yet another advantage of the present invention is to provide a system and a method for managing and/or rendering internet multimedia content in a network that find, retrieve, bookmark and/or organize the internet multimedia content in a web browser and provide access to the internet multimedia content to rendering devices, control points and/or multimedia clients.

Moreover, an advantage of the present invention is to provide a system and a method for managing and/or rendering internet multimedia content in a network that determine which of the rendering devices in the network are capable of rendering specific multimedia content.

Additional features and advantages of the present invention are described in, and will be apparent from, the detailed description of the presently preferred embodiments and from the drawings.

BRIEF DESCRIPTION OF THE DRAWINGS

FIG. 3 illustrates a system for managing and/or rendering internet multimedia content in a network in an embodiment of the present invention.

FIG. 4 illustrates an application for managing and/or rendering internet multimedia content in a network in an embodiment of the present invention.

FIG. 9 illustrates a flowchart of a method for managing and/or rendering internet multimedia content in a network in an embodiment of the present invention.

DETAILED DESCRIPTION OF THE PREFERRED EMBODIMENTS

Figure 1:
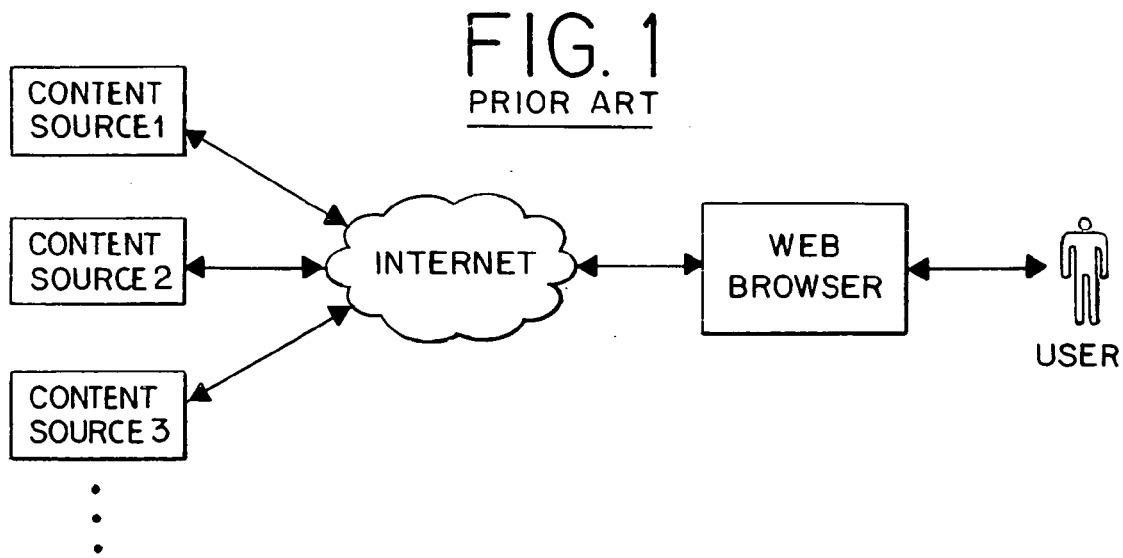
FIG. 1 illustrates a prior art system for rendering internet multimedia content.
Figure 2:
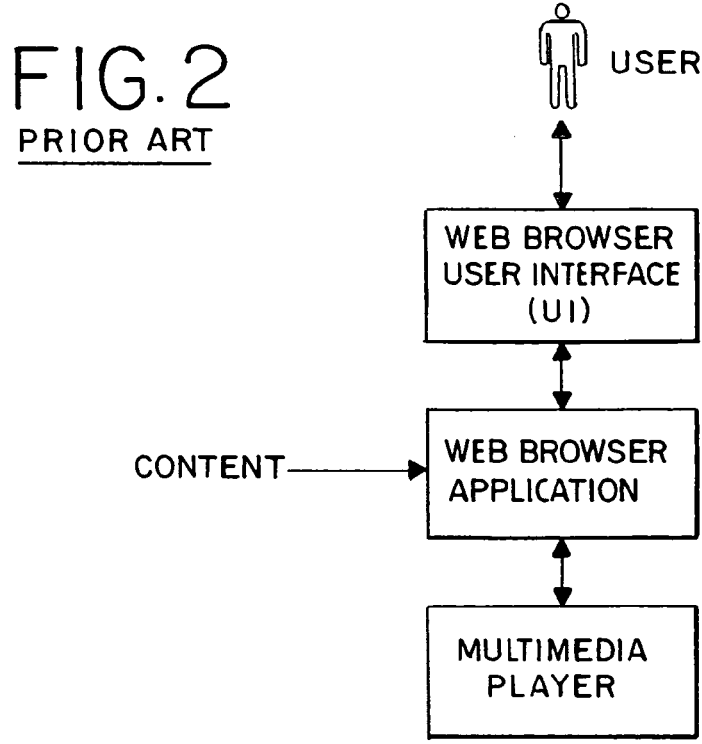
FIG. 2 illustrates a prior art system for rendering internet multimedia content.

The present invention generally relates to a system and a method for managing and/or rendering internet multimedia content in a network. More specifically, the present invention relates to a system and a method that utilize an application to render the internet multimedia content and/or locally stored multimedia content on one or more rendering devices in the network. The application may provide web browser functions, such as, for example, requesting, receiving, processing, decoding and/or rendering the internet multimedia content. The application may send the internet multimedia content to one or more rendering devices in a home network for rendering. The application may have an enhanced user interface which may enable a user to select the internet multimedia content and a rendering device in the home network, send the internet multimedia content to the rendering device and/or control rendering of the internet multimedia content on the rendering device. The application may manage both the internet multimedia content and the locally stored multimedia content in the network.

Referring now to the drawings wherein like numerals refer to like parts, FIG. 3 generally illustrates a system 10 for managing and/or rendering internet multimedia content in a network. The system 10 may have an application 15 which may be connected to the internet 25 by a network 20. In a preferred embodiment, the network 20 may be a home network. The network 20 may have connections that are wired or wireless. For example, the network 20 may be based on one or more of the following technologies: Ethernet/wired LAN, IEEE 1394 ("Fire Wire") and/or IEEE 802.11 ("WiFi"). The network 20 may utilize other technologies not listed herein. The present invention is not limited to a specific embodiment of the network 20.

The application 15 may use the network 20 and/or the internet 25 to access one or more internet content sources, such as, for example, a web server, a multimedia server and/or any source of internet multimedia content. For example, the internet content sources may provide the internet multimedia content to the application 15 using well-known internet delivery protocols, such as, for example, Hypertext Transfer Protocol ("HTTP"), Real Time Streaming Protocol ("RTSP"), Transmission Control Protocol ("TCP"), User Datagram Protocol ("UDP") and/or Real-time Transport Protocol ("RTP"). For example, the application 15 may access a first internet content source 31, a second internet content source 32 and/or a third internet content source 33 (collectively "the internet content sources 31, 32, 33").

The application 15 may use the network 20 to access one or more local content sources, such as, for example, a personal computer; a laptop computer; a Network Attached Storage ("NAS") device which may have server capability; a Digital Video Recorder which may have server capability; a portable computing device which may have server capability, such as a mobile telephone or a personal digital assistant; and/or a media capture device, such as a digital still camera or a camcorder, which may have server capability. For example, the application 15 may access a local content source 35. The present invention is not limited to a specific embodiment of the internet content sources or the local content sources or a specific number of the internet content sources or the local content sources. The system 10 does not have an upper limit to a number of internet content sources or local content sources which may be accessed by the application 15.

The application 15 may be connected to one or more rendering devices by the network 20. The rendering devices may be capable of receiving multimedia content using the network 20 and/or rendering the multimedia content for a user 40. The rendering devices may be, for example, a DLNA-compliant television, a DLNA-compliant set-top box connected to a television which may or may not be DLNA-compliant, a DLNA-compliant stereo system, a DLNA-compliant audio adapter device connected to a stereo system which may or may not be DLNA-compliant, a DLNA-compliant photo frame, a personal computer, a laptop computer, a mobile device, a mobile telephone, a personal digital assistant, a video game console, a UPnP AV rendering device and/or the like. For example, a first rendering device 21, a second rendering device 22 and/or a third rendering device 23 (collectively "the rendering devices 21, 22, 23") may be connected to the application 15 by the network 20. The multimedia content may be and/or may have audio content, video content, audio-visual content, digital photos and/or the like. For example, the multimedia content may be the internet multimedia content and/or multimedia content locally stored in the network 20. The present invention is not limited to a specific embodiment of the rendering devices or the multimedia content.

The application 15 may be provided by and/or stored by a computer readable medium, such as, for example, a compact disc, a DVD, a computer memory, a hard drive and/or the like. The computer readable medium may enable the network 20 to execute the application 15. The application 15 may reside on a device connected to the network 20, such as, for example, a personal computer, a laptop computer, a mobile device, a dedicated stand-alone device, a network-capable television, a network-capable set-top box, a network-capable stereo system that may have a user interface screen, a network-capable audio adapter device that may have a user interface screen and/or the like. The network 20 may have more than one device that may execute the application 15. The present invention is not limited to a specific embodiment of the device on which the application 15 may reside.

The user 40 may access the application 15 for web browsing tasks using a user interface. Thus, the user 40 may use the user interface of the application 15 to search for the internet multimedia content, to retrieve and display webpages, to navigate within the webpages, to select links within the webpages, to retrieve and/or play the internet multimedia content which may be accessible from the webpages, and/or other common web browser tasks and functionalities which are known to one having ordinary skill in the art. If the application 15 renders the internet multimedia content within the user interface of the application 15, the internet multimedia content may be rendered within a webpage, or the internet multimedia content may be rendered in a separate multimedia player window.

The application 15 may display playback controls to allow the user 40 to control rendering of the internet multimedia content. For example, the playback controls may enable the user 40 to play, pause, seek forward, seek backward, replay from the beginning and/or the like. The playback controls may enable the application 15 to support rendering and/or control of internet multimedia content similar to a typical web browser.

The application 15 may identify the internet multimedia content which the user 40 may be accessing and/or may be consuming using the user interface of the application 15. The application 15 may present enhanced multimedia options for the internet multimedia content. The enhanced multimedia options may enable the user to distribute the internet multimedia content to one or more of the rendering devices 21, 22, 23 in the network 20. The enhanced multimedia options may enable the user 40 to view which of the rendering devices 21, 22, 23 may be available and/or to select an available rendering device from the rendering devices 21, 22, 23 to transfer the internet multimedia content to the selected rendering device.

The application 15 may establish one or more of the rendering devices 21, 22, 23 as a default rendering device. The internet multimedia content may be transferred to the default rendering device without selecting from the rendering devices 21, 22, 23. The application 15 may allow the user 40 to establish a default rendering device for different content types. For example, the first rendering device 21 may be established as the default rendering device for audio content, and/or the second rendering device 22 may be established as the default rendering device for video content.

The enhanced multimedia options may enable the user 40 to add the internet multimedia content to a list of bookmarks so that a specific multimedia content object may be retrieved later by the user 40. The application 15 may enable the user 40 to add multimedia content files stored in the network 20 to the list of bookmarks. For example, the application 15 may add multimedia content files stored in the local content source 35 to the list of bookmarks. As a further example, the multimedia content files added to the list of bookmarks may be stored by devices connected to the network 20, such as, for example, file servers and/or personal computers. The application 15 may enable the user 40 to organize the bookmarks into categories, areas, folders and/or the like without regard to whether individual bookmarks refer to the internet multimedia content or to the multimedia content files stored in the network 20. The application 15 may enable the user 40 to associate a default rendering device with one or more of the bookmarks so that selection of the bookmark may initiate rendering of the associated multimedia content by the default rendering device without selection from the rendering devices 21, 22, 23. The application 15 may enable the user 40 to associate a default rendering device to a bookmark category, area, folder and/or the like so that selection of any bookmark in the associated category, area and/or folder may direct rendering of the associated multimedia content by the default rendering device without selection from the rendering devices 21, 22, 23.

The application 15 may enable the user 40 to create one or more playlists based on the bookmarks. The playlist may enumerate a list of multimedia content objects which may be, for example, the internet multimedia content and/or the multimedia content files stored in the network 20. The list of multimedia content objects may be played back in sequence on one or more of the rendering devices 21, 22, 23 in the network 20. The playlist may refer to the internet multimedia content, the multimedia content files stored in the network 20 and/or a combination of the internet multimedia content objects and the multimedia content files stored in the network 20. The application 15 may enable the user to play the multimedia content objects of the playlist within the user interface of the application 15. The application 15 may enable the user 40 to direct the multimedia content objects of the playlist to one or more of the rendering devices 21, 22, 23 in the network 20. The application 15 may enable the user 40 to associate a default rendering device with the playlist so that later rendering of the multimedia content objects of the playlist may be directed to the default rendering device without selection from the rendering devices 21, 22, 23.

FIG. 4 illustrates a black-box diagram of the application 15 in an embodiment of the present invention. The application 15 may have web browser components. For example, the components of the application 15 may be a browser user interface 50, a web browser application 60 and/or one or more multimedia players 70. The browser user interface 50 may present browser controls that may enable the user 40 to perform web browser tasks using the application 15. For example, the browser user interface 50 may enable the user 40 to search for internet content, to retrieve and display webpages, to navigate within the webpages, to select links within the web pages, to retrieve and play the internet multimedia content which may be accessible from the webpages and/or other common web browser tasks and functionalities known to one having ordinary skill in the art. The browser user interface 50 may accept user input using input means associated with the device on which the application 15 resides. For example, the input means may be a keyboard, a keypad, a mouse, a 4-way navigation pad, a click wheel, a joystick, a touch screen, a set of programmable "soft keys," a series of buttons on a remote control associated with a television or a set-top box and/or the like. The "soft keys" may be buttons which may perform a function dependent on text shown on a display screen adjacent to the buttons. The present invention is not limited to a specific embodiment of the input means.

The web browser application 60 may retrieve the internet content from remote servers, such as, for example, the internet content sources 31, 32, 33; may process and/or may interpret the internet content; may display the internet content to the user 40 using the browser user interface 50; and/or may perform other web browser tasks known to one having ordinary skill in the art. The web browser application 60 may retrieve, may process, may decode and/or may render the internet multimedia content. The browser user interface 50 may render the internet multimedia content retrieved, processed and/or decoded by the web browser application 60.

The multimedia player 70 that may be connected to and/or may be associated with the web browser application 60 may receive, may process, may decode and/or may render the internet multimedia content. In an embodiment, the internet multimedia content and/or the multimedia content files stored in the network 20 may be received by the web browser application 60. The web browser application 60 may transmit the internet multimedia content and/or the multimedia content files stored in the network 20 to the multimedia player 70 which may process and/or may decode the internet multimedia content and/or the multimedia content files stored in the network 20. The multimedia player 70 may transmit decoded multimedia content to the web browser application 60 which may render the decoded multimedia content using the browser user interface 50.

The present invention is not limited to a specific arrangement of the web browser application 60 and the multimedia player 70. One having ordinary skill in the art may recognize alternative embodiments. For example, the multimedia content may be received directly by the multimedia player 70 without passing through the web browser application 60. As another example, the multimedia player 70 may directly pass the decoded multimedia content to the browser user interface 50, to a display of the device on which the application 15 resides and/or to an additional device associated with the device on which the application 15 resides. The present invention is not limited to the arrangement of the components of the application 15 illustrated in FIG. 4.

As FIG. 4 generally illustrates, an embodiment of the application 15 may have additional components which may provide enhanced multimedia functionality of the application 15. The application 15 may have an enhanced multimedia user interface 80 which may enable the user 40 to control the enhanced multimedia functionality of the application 15. The application 15 may have a transcoding engine 90 which may transcode, may reformat and/or may repurpose the internet multimedia content for compatibility with one or more of the rendering devices 21, 22, 23 in the network 20. The application 15 may have a media server component 100 which may transfer the multimedia content to one or more of the rendering devices 21, 22, 23 in the network 20.

The application 15 may have a renderer discovery and control component 110 (hereafter "the RDC component 110") which may determine available rendering devices in the network 20, such as, for example, the rendering devices 21, 22, 23. The RDC component 110 may determine capabilities of the available rendering devices in the network 20, such as, for example, capabilities of the rendering devices 21, 22, 23. The RDC component 110 may communicate with the available rendering devices in the network 20 to initiate, maintain and/or control delivery of the multimedia content to and/or rendering of the multimedia content by the available rendering devices. The application 15 may have a content management component 120 which may enable the user 40 to organize and/or to manage the internet multimedia content and/or the multimedia content files stored in the network 20. The content management component 120 may organize and/or may manage bookmarks, playlists, preferences and settings which may be associated with the multimedia content.

The enhanced multimedia user interface 80 of the application 15 may present enhanced multimedia options associated with an active multimedia object. The active multimedia object may be the internet multimedia content which the user 40 may be accessing, using and/or consuming using the application 15. For example, the active multimedia object may be the internet multimedia content which the user 40 may be accessing, using and/or consuming on the browser user interface 50 and/or the multimedia player 70. Thus, for each of the active multimedia objects, the enhanced multimedia options presented by the application 15 may be appropriate for the active multimedia object.

In an embodiment, the enhanced multimedia options may be presented using elements of the enhanced multimedia user interface 80 that may be co-located with the active multimedia object. For example, the enhanced multimedia options may be superimposed over a video object and/or an image object of the active multimedia object. As a further example, the enhanced multimedia options may appear as a graphic button, a graphic tab and/or the like located in proximity to the video object and/or the image object of the active multimedia object. The enhanced multimedia options may be integrated with the playback controls for the active multimedia object. The enhanced multimedia options may utilize a drop-down menu, a pull-out drawer, a sequence of buttons and/or icons, a carousel of buttons and/or icons and/or any other user interface elements for displaying and selecting options as known to one skilled in the art.

The enhanced multimedia options may be, for example, "Redirect," "Bookmark," "Record," "Properties" and/or "Manage" as described in further detail hereafter. In response to selection of the enhanced multimedia option "Redirect," the application 15 may direct one or more of the available rendering devices to render the active multimedia object. For example, the application 15 may control delivery of the active multimedia object to one or more of the rendering devices 21, 22, 23. In response to selection of the enhanced multimedia option "Bookmark," the application 15 may create a bookmark for the active multimedia object. In response to selection of the enhanced multimedia option "Record," the application 15 may store the active multimedia object as a digital multimedia content file on a local server in the network 20, such as, for example, the local content source 35. In response to selection of the enhanced multimedia option "Properties," the application 15 may display detailed information about the active multimedia object. In response to selection of the enhanced multimedia option "Manage," the application 15 may provide a menu that has additional content management options as discussed in further detail hereafter.

The application 15 may present a plurality of "Redirect" options so that each of the plurality of "Redirect" options may correspond to one or more of the available rendering devices in the network 20, such as, for example, one or more of the rendering devices 21, 22, 23. The application 15 may determine which of the available rendering devices may be capable of rendering the active multimedia object, and/or the plurality of "Redirect" options may correspond to the available rendering devices which may be capable of rendering the active multimedia object. User input may define a selected "Redirect" option of the plurality of "Redirect" options, and the rendering device associated with the selected "Redirect" option may initiate rendering of the active multimedia object. In response to selection of one of the plurality of "Redirect" options, the application 15 may initiate repurposing and/or transmitting the active multimedia object to the rendering device associated with the selected "Redirect" option, and/or the rendering device associated with the selected "Redirect" option may begin rendering the active multimedia object.

The application 15 may present additional controls to enable the user 40 to control rendering of the active multimedia content on the associated rendering device. The application 15 may discontinue local rendering of the active multimedia object within the browser user interface 50, or the application 15 may continue to render the active multimedia object within the browser user interface 50 in approximate synchronization with rendering of the active content object by the rendering device associated with the selected "Redirect" option.

The enhanced multimedia option "Bookmark" may create a bookmark for the active multimedia object so that subsequent selection of the bookmark may enable the active multimedia object to be retrieved, repurposed and/or redirected to one or more of the available rendering devices in the network 20, such as, for example, one or more of the rendering devices 21, 22, 23. The application 15 may enable the user 40 to establish a default rendering device for the bookmark, such as, for example, when the bookmark is created. The application 15 may establish the default rendering device for the bookmark as the rendering device to which the user 40 redirects the active multimedia object using one of the plurality of "Redirect" options.

In response to selection of the enhanced multimedia option "Record," the application 15 may store the active multimedia object as a digital multimedia content file on a local server in the network 20, such as, for example, the local content source 35. The enhanced multimedia option "Record" may enable the user 40 to select a location for storage of the active multimedia object as the digital multimedia content file. The enhanced multimedia option "Record" option may enable the user 40 to create a filename, a full name, a summary comment and/or other properties of the digital multimedia content file stored on the local server. The application 15 may determine if the active multimedia object may be appropriate for recording. The active multimedia object may not be appropriate for recording, such as, for example, an active multimedia object protected by digital rights management technology (hereafter "DRM technology"). As a further example, an active content object lacking definite timeline boundaries may not be appropriate for recording. An internet radio channel may not have definite timeline boundaries, for example. The application 15 may present the enhanced multimedia option "Record" for the active multimedia objects which may be appropriate for recording.

The enhanced multimedia option "Properties" may enable the user 40 to view properties of the active multimedia object. The properties may be content properties, such as, for example, an object title, an object classification and/or genre, an associated artist, an associated television series, an associated music album and/or the like. The properties may be file properties, such as, for example, a file size, a file format, a playback duration, one or more media codecs, one or more media encoding parameters and/or the like. The properties may be legal properties, such as, for example, an indication of protection of the active multimedia object by DRM technology, an indication of protection of the active multimedia object by terms of use, a list of one or more usage restrictions and/or the like.

The enhanced multimedia option "Manage" may enable the user 40 to access the additional content management options, such as, for example, a bookmark management option, a playlist management option, a file management option and/or the like. The user 40 may select the bookmark management option to organize, arrange, classify, create, modify, rename, delete and/or invoke bookmarks associated with multimedia content objects. The user 40 may select the playlist management option to create, modify, rename, delete and/or use playlists. The user 40 may select the file management option to browse, organize, arrange, classify, rename, delete, and/or use the multimedia content files which may be stored on the local server. For example, the multimedia content files stored in the network 20 may be the digital multimedia content files created using the enhanced multimedia option "Record" of the application 15 and/or multimedia content files stored in the network 20 by other means.

Figure 5:
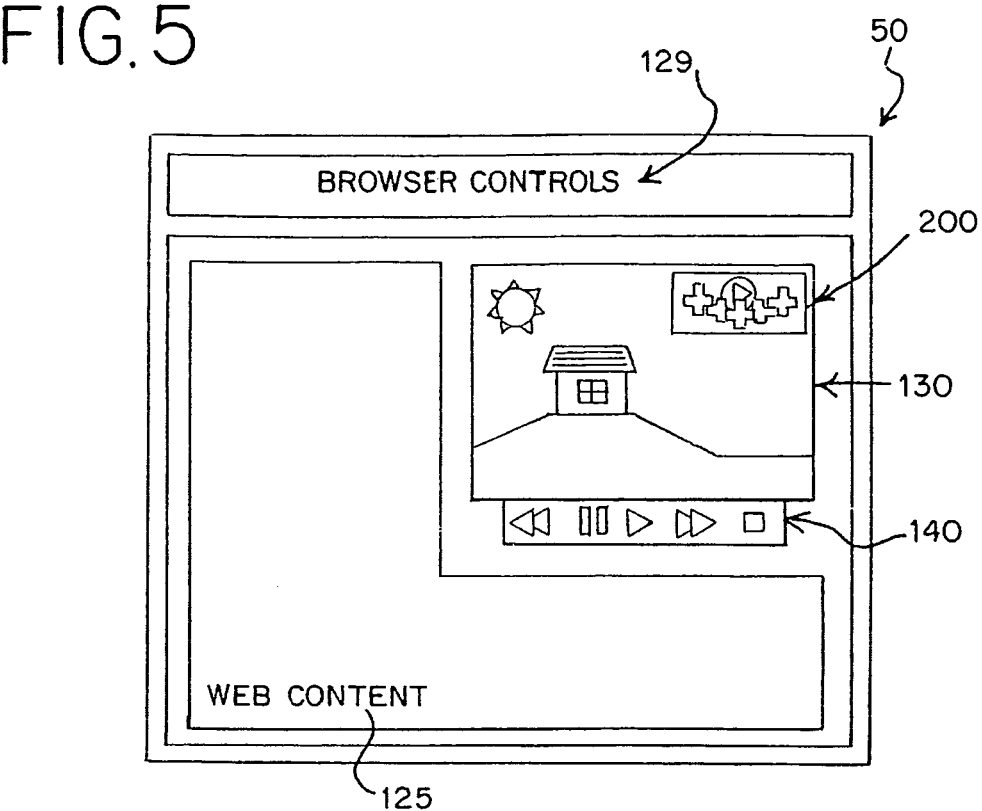
FIG. 5 illustrates a browser user interface in an embodiment of the present invention.
Figure 6:
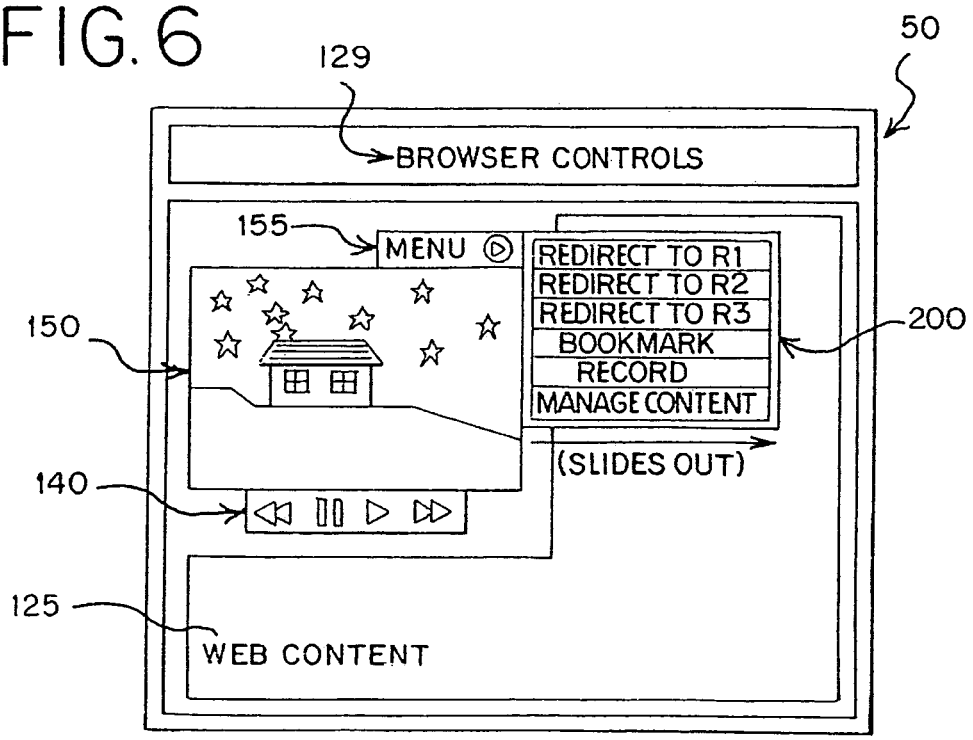
FIG. 6 illustrates a browser user interface in an embodiment of the present invention.
Figure 7:
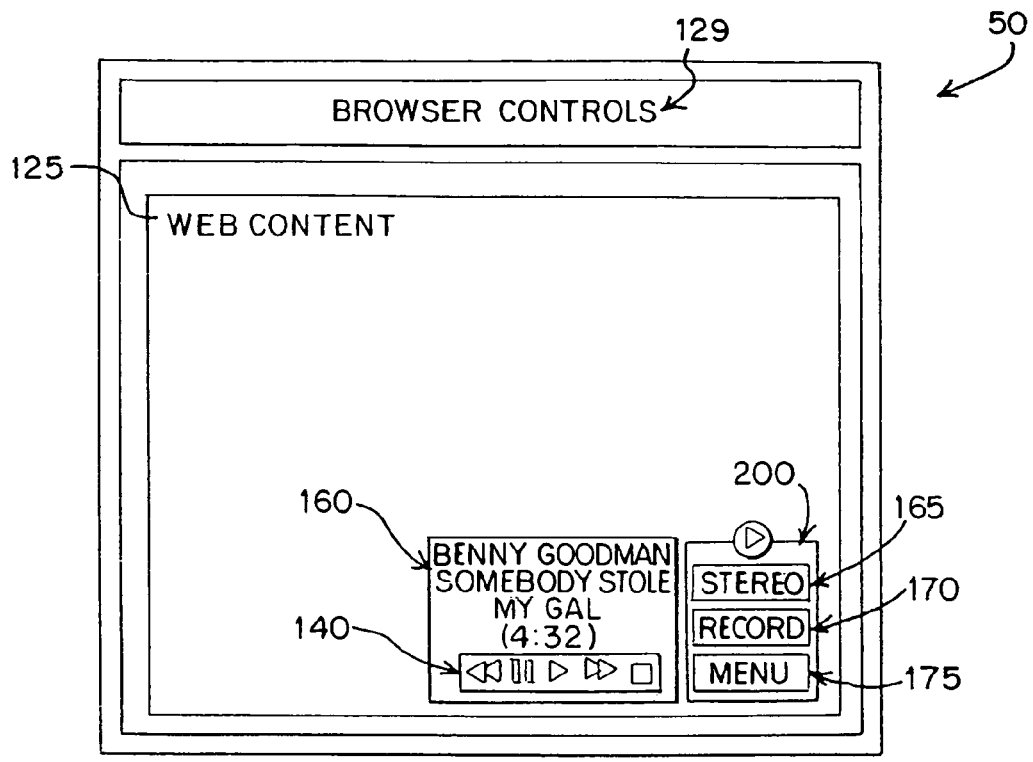
FIG. 7 illustrates a browser user interface in an embodiment of the present invention.

FIGS. 5-7 generally illustrate presentation of the enhanced multimedia options to the user 40 in embodiments of the present invention. FIG. 5 generally illustrates the browser user interface 50 having the enhanced multimedia controls 200 for an active video object 130 in an embodiment of the present invention. The browser user interface 50 of the application 15 may display the browser controls 129 and/or the internet content 125. The internet content 125 may include the active video object 130. The user 40 may view the active video object 130 in the browser user interface 50 of the application 15. The user 40 may control rendering of the active video object 130 using the playback controls 140 associated with the active video object 130. Thus, the active video object 130 may be viewed and/or may be controlled using the browser user interface 50 of the application 15.

The application 15 may display the enhanced multimedia controls 200 in association with the active video object 130. The enhanced multimedia controls 200 may be displayed as an overlay on the active video object 130 as generally illustrated in FIG. 5. The enhanced multimedia controls 200 may be continuously present, or, alternatively, the enhanced multimedia controls may be displayed and/or may be provided after a specific action by the user 40. For example, the enhanced multimedia controls 200 may be displayed and/or may be provided after the user 40 initiates rendering of the active video object 130 using the playback controls 140. As another example, the enhanced multimedia controls 200 may be displayed and/or may be provided after the user 40 positions an arrow or other pointing icon within boundaries of the active video object.

The enhanced multimedia controls 200 may be displayed as graphic icons which may represent the enhanced multimedia options of the application 15. The graphic icons may be displayed as a flat list of icons, a rotating carousel of icons, a rectangular arrangement of icons and/or any other arrangement known to one having ordinary skill in the art. The present invention is not limited to a specific arrangement or a specific presentation of the graphic icons.

The user 40 may select and/or may activate one or more of the graphic icons to invoke a corresponding enhanced multimedia option 200 of the application 15. For example, one or more of the graphic icons may represent the enhanced multimedia option "Redirect" for directing the active video object to one of the rendering devices 21, 22, 23, such as, for example, a living room television. One of the graphic icons may be an image representing the living room television. The user 40 may select and/or may activate the graphic icon representing the living room television to direct the living room television to render the active video object. The application 15 may transmit the active video object to the living room television.

The enhanced multimedia controls 200 may have a plurality of graphic icons. Each of the plurality of graphic icons may correspond to one of the plurality of "Redirect" options and/or one or more of the rendering devices 21, 22, 23. The enhanced multimedia controls 200 may have graphic icons which may represent other enhanced multimedia options of the application 15, such as, for example, the enhanced multimedia option "Bookmark," the enhanced multimedia option "Record," the enhanced multimedia option "Properties" and/or the enhanced multimedia option "Manage." The enhanced multimedia options which may be displayed may vary based on the embodiment of the application 15. The present invention is not limited to a specific embodiment of which enhanced multimedia options may be displayed.

FIG. 6 generally illustrates the browser user interface 50 having the enhanced multimedia controls 200 for an active image object 150 in an embodiment of the present invention. The browser user interface 50 of the application 15 may display the browser controls 129 and/or the internet content 125. The internet content 125 may include the active image object 150. The active image object 150 may represent a collection of images which may be viewed within the browser user interface 50 of the application 15 as a sequence of images known as a slideshow. The user 40 may control rendering of the collection of images by using the playback controls 140 associated with the active image object 150. Thus, the active image object 150 may be viewed and/or may be controlled using the browser user interface 50 of the application 15.

The application 15 may display the enhanced multimedia controls 200 in association with the active image object 150. The enhanced multimedia controls 200 may be displayed as a menu which may appear to slide out of the active image object 150 as illustrated in FIG. 6. The application 15 may present an activation control 155 in association with the active image object. The activation control 155 may control appearance and/or disappearance of the menu providing the enhanced multimedia controls 200. For example, the activation control 155 may be a "Menu" button. Selection of the "Menu" button may cause the menu of the enhanced multimedia controls 200 to appear, such as, for example, by appearing to slide out from the active image object, or disappear, such as, for example, by appearing to slide into the active image object. The application 15 may provide access to the enhanced multimedia controls 200 for the active image object while minimizing disturbance to the internet content that may surround the active image object.

One having ordinary skill in the art may recognize other means of displaying the menu of the enhanced multimedia controls in the browser user interface 50. For example, the menu may appear to "pop up" in response to "right-clicking" of the mouse on the active image object by the user 40. The present invention is not limited to a specific embodiment of means of accessing and/or activating the menu of the enhanced multimedia controls 200.

The enhanced multimedia controls 200 may be provided by options displayed in the menu. The user 40 may select and/or may activate one or more of the options to invoke a corresponding one of the enhanced multimedia options of the application 15. As illustrated in FIG. 6, the application 15 may display the plurality of "Redirect" options that may correspond to the rendering devices 21, 22, 23 in the network 20. The application 15 may limit the plurality of "Redirect" options to only correspond to the rendering devices 21, 22, 23 which may be capable of rendering the active image object. The user 40 may select and/or may activate one or more of the plurality of "Redirect" options to direct the corresponding rendering device to render the active image object.

For example, in FIG. 6, R1 may represent the first rendering device 21 which may be the living room television, R2 may represent the second rendering device 22 which may be a digital photo frame in the bedroom and/or R3 may represent the third rendering device 23 which may be a personal computer in the den. In this case, the user 40 may select the "Redirect to R2" option to initiate rendering of the active image object on the digital photo frame in the bedroom. The enhanced multimedia controls may have other enhanced multimedia options of the application 15, such as, for example, the enhanced multimedia option "Bookmark," the enhanced multimedia option "Record," the enhanced multimedia option "Properties" and/or the enhanced multimedia option "Manage." The present invention is not limited to a specific embodiment of which enhanced multimedia options may be displayed.

FIG. 7 generally illustrates the browser user interface 50 having the enhanced multimedia controls 200 for an active audio object. The browser interface 50 of the application 15 may display the browser controls 129 and/or the internet content 125. The internet content 125 may have the playback controls 140 and/or a status display 160 corresponding to the active audio object. The active audio object may represent a single digital music file, a set of digital music files, an internet radio channel, a music stream and/or the like. Audio corresponding to the active audio object may be rendered by a local audio device associated with the application 15, such as, for example, a personal computer sound card, headphones, speakers and/or the like. The user 40 may control rendering of the audio by using the playback controls 140 associated with the active audio object. Thus, the active audio object may be rendered and/or may be controlled using the browser user interface 50 of the application 15.

The application 15 may display the enhanced multimedia controls 200 in association with the active audio object. The enhanced multimedia controls may be displayed as a set of buttons and/or graphic icons located in proximity to the playback controls and/or the status display for the active audio object as illustrated in FIG. 7. The application 15 may present a central set of the enhanced multimedia controls 200 which may apply to any active audio object. For example, the application 15 may display a "drop-down menu" for the audio. The central set of the enhanced multimedia controls 200 may appear within the browser controls 129 and/or may be used to invoke the enhanced multimedia functions of the application 15 for the active audio object which the local audio device may be rendering.

The enhanced multimedia controls 200 may provide and/or may display one or more of the enhanced multimedia option "Redirect" to direct an audio rendering device of the rendering devices 21, 22, 23 in the network 20 to render the active audio object. In the embodiment depicted in FIG. 7, the enhanced multimedia option "Redirect" 165 may be associated with a specific stereo system in the network 20. A graphic icon which may correspond to the enhanced multimedia option "Redirect" 165 may indicate the specific stereo system using a text label, a graphic depiction of the specific stereo system and/or the like. The user 40 may select and/or may activate the enhanced multimedia option "Redirect" 165 to initiate rendering of the active audio object by the specific stereo system.

The central set of the enhanced multimedia controls 200 may provide and/or may display other functions, such as, for example, the enhanced multimedia option "Record" 170 and/or the enhanced multimedia option "Menu" 175. Selection of the enhanced multimedia option "Record" 170 may enable the user 40 to store a portion or an entirety of the audio content corresponding to the active audio object. The portion and/or the entirety of the audio content may be stored as one or more audio files, such as, for example, in the local server of the network 20. For example, the audio file may be stored in the local content source 35.

Selection of the enhanced multimedia option "Menu" 175 may enable the user 40 to access a menu that may have one or more of the additional enhanced multimedia options of the application 15, such as, for example, the enhanced multimedia option "Bookmark," the enhanced multimedia option "Properties," the enhanced multimedia option "Manage," and/or additional "Redirect" options corresponding to additional rendering devices in the network 20. The application 15 may display limited options to enable access to the enhanced multimedia options that may be most commonly used for the active audio object. The enhanced multimedia option "Menu" may access the additional enhanced multimedia options. The present invention is not limited to a specific embodiment of which enhanced multimedia options may be displayed or an arrangement of the enhanced multimedia options.

If the application 15 directs a target rendering device of the available rendering devices in the network 20 to render the active multimedia object, the application 15 may enable the user 40 to control delivery and/or rendering of the active multimedia object on the target rendering device. For example, the target rendering device may be one or more of the rendering devices 21, 22, 23. The application 15 may present additional playback controls which may enable the user 40 to remotely control the playback of the content on the target rendering device. The additional playback controls may have and/or may be, for example, "Play," "Pause," "Stop," "Rewind," "Fast Forward," "Seek to a specific time," "Volume Up," "Volume Down," "Previous object," "Next object" and/or other playback controls known to one having ordinary skill in the art. In an embodiment, the additional playback controls may be only displayed during rendering of the active multimedia object on the target rendering device.

Alternatively, the application 15 may not display and/or may not provide the additional playback controls. The application 15 may enable the user 40 to control the rendering by the target rendering device using the playback controls 140 which may be used to control rendering of the active multimedia object within the browser user interface 50 of the application 15. The application 15 may continue to display and/or to render the active multimedia object within the browser user interface 50 of the application 15 while substantially simultaneously and/or substantially synchronously rendering the active multimedia object on the target rendering device. For example, the playback controls 140 of the browser user interface 50 may be used to control rendering of the active multimedia object by both the browser user interface 50 and the target rendering device.

During rendering of the active multimedia object on the target rendering device, the user 40 may use the browser user interface 50 of the application 15 to navigate to a different webpage from the webpage having and/or providing the multimedia content. In an embodiment, the application 15 may terminate the rendering of the active multimedia object on the target rendering device in response to navigation from the webpage having and/or providing the active multimedia object. In another embodiment, the application 15 may continue to render the active multimedia object on the target rendering device. The application 15 may display and/or may continue to display the additional playback controls so that the user 40 may continue to control the rendering of the active multimedia object by the target rendering device.

Referring again to FIG. 4, the application 15 may have the RDC component 110. The RDC component 110 may determine the available rendering devices in the network 20, such as, for example, the rendering devices 21, 22, 23. The RDC component 110 may determine the capabilities of the available rendering devices in the network 20 such as, for example, the capabilities of the rendering devices 21, 22, 23. The available rendering devices in the network 20 may transmit messages in the network 20 to communicate availability and/or the capabilities to other devices in the network 20. The RDC component 110 may receive the messages from the available rendering devices. The RDC component 110 may use the network 20 to communicate with the available rendering devices to determine a current status of the available rendering devices and/or to determine additional capability details for the available rendering devices.

The RDC component 110 may create, may maintain and/or may update an internal list of the available rendering devices in the network 20. The internal list may have the capabilities of the available rendering devices. The capabilities of the available rendering devices may have and/or may be, for example, media types, such as, for example, audio, video and/or image; multimedia codecs, such as, for example, AAC Audio codec, H.264 video codec and/or the like; profiles and/or levels associated with the multimedia codecs; transport methods; and/or DRM technologies which may be supported by the available rendering devices. The present invention is not limited to a specific embodiment of the capabilities which may be determined by the RDC component 110. The RDC component 110 may be and/or may act as a UPnP AV Control Point and/or a DLNA Control Point.

In response to user input directing the target rendering device to render the active multimedia object, such as, for example, selection of the enhanced multimedia option "Redirect," the RDC component 110 may communicate with the target rendering device. The RDC component 110 may instruct the target rendering device to request, to retrieve, to process and/or to render the active multimedia object. The RDC component 110 may communicate with the target rendering device to control the rendering of the active multimedia object. For example, the RDC component 110 may control the rendering of the active multimedia object by the target rendering device in accordance with the playback controls which may be selected by the user 40. The RDC component 110 may transmit rendering control instructions to the target rendering device. The rendering control instructions may correspond to the additional playback controls, such as, for example, "Play," "Pause," "Stop," "Rewind," "Fast Forward," "Seek to a specific time," "Volume Up," "Volume Down," "Previous object," "Next object" and/or the other playback controls known to one having ordinary skill in the art.

The application 15 may have the transcoding engine 90 which may transcode, may reformat and/or may repurpose the internet multimedia content for compatibility with one or more of the available rendering devices in the network 20, such as, for example, the rendering devices 21, 22, 23. The transcoding engine 90 may receive instructions from the enhanced multimedia user interface 80 regarding selection of the internet multimedia content to render and/or the target rendering device. The transcoding engine 90 may communicate with the RDC component 110 to determine the capabilities of the target rendering device. The transcoding engine 90 may access the internet multimedia content using the web browser application 60 and/or the multimedia player 70. The transcoding engine 90 may access the internet multimedia content directly using the Internet. The transcoding engine 90 may process the internet multimedia content to prepare the internet multimedia content for delivery to the target rendering device.

The transcoding engine 90 may transcode the internet multimedia content based on the capabilities of the target rendering device. For example, the transcoding engine 90 may transcode the internet multimedia content to produce transcoded internet multimedia content which may conform to media codecs, profiles and/or levels which may be supported by the target rendering device. The transcoding engine 90 may reformat the internet multimedia content. For example, the transcoding engine 90 may reformat the internet multimedia content to produce reformatted internet multimedia content which may have a delivery format appropriate for the target rendering device.

The transcoding engine 90 may examine digital rights management protection (hereafter "the DRM protection"), if any, of the internet multimedia content to determine restrictions for transferring the internet multimedia content to and/or rendering the content on the target rendering device. The transcoding engine 90 may determine that the restrictions may require secure transfer of the internet multimedia content to the target rendering device. The transcoding engine 90 may reformat the internet multimedia content for secure transfer to the target rendering device, and/or the transcoding engine 90 may inform the media server component 100 that the secure transfer may be required. The reformatting for and/or the communication about the secure transfer may reflect a specific method of secure transfer which may be required by the restrictions.

The transcoding engine 90 may determine that the restrictions for the internet multimedia content do not permit transferring the internet multimedia content to and/or rendering the internet multimedia content on the target rendering device. The transcoding engine 90 may not permit transfer of the internet multimedia content to the target rendering device. The application 15 may inform the user 40 that rendering of the internet multimedia content by the target rendering device may not be allowed due to the restrictions.

The application 15 may have the content management component 120 which may enable the user 40 to create, edit, delete, organize, and/or manage bookmarks, playlists, the internet multimedia content recorded by the application 15 and/or other locally stored multimedia content. Functions of the content management component 120 may be accessible using the enhanced multimedia option "Bookmark" and/or the enhanced multimedia option "Manage" as previously described.

The application 15 may have the media server component 100 which may receive transcoded, reformatted and/or repurposed internet multimedia content from the transcoding engine 90. The media server component 100 may be a web server, an RTSP media server, a UPnP AV media server, a DLNA compliant media server and/or any media server known to one having ordinary skill in the art. The present invention is not limited to a specific embodiment of the media server component 100. The media server component 100 may deliver the transcoded, reformatted and/or repurposed internet multimedia content to the target rendering device using the network 20. The media server component 100 may store and/or may buffer a portion and/or an entirety of the transcoded, reformatted and/or repurposed internet multimedia content received from the transcoding engine 90.

The media server component 100 may be visible to and/or may be accessible to rendering devices, other devices, control points and/or multimedia clients in the network 20. The media server component 100 may identify, may indicate availability of and/or may provide access to the multimedia content identified by the application 15, such as, for example, the internet multimedia content bookmarked by the user 40; the internet multimedia content recorded by the user 40; the internet multimedia content retrieved, browsed and/or consumed by the user 40; the multimedia content files stored in the network 20; and/or the playlists created by the user 40.

The media server component 100 may indicate the availability of the multimedia content based on categories, areas and/or folders which the user 40 may have created using the content management component 120 of the application 15. The media server component 100 may indicate the availability of the multimedia content and/or may provide access to the multimedia content to the rendering devices, the other devices, the control points and/or the multimedia clients in the network 20. For example, the media server component 100 may indicate the availability of the multimedia content and/or may provide the access to the multimedia content regardless of whether the application 15 is being actively used and/or controlled by the user 40 using the browser user interface 50 and/or the enhanced multimedia user interface 80. Thus, the user 40 may discover, may select and/or may access the multimedia content, such as, for example, the internet multimedia content, directly from devices in the network 20.

For example, the user 40 may discover internet multimedia content using the browser user interface 50 of the application 15. The user 40 may bookmark the internet multimedia content using the enhanced multimedia user interface 80 and/or the content management component 120 of the application 15. The media server component 100 of the application 15 may act as a UPnP AV media server to indicate availability of the bookmarked internet multimedia content to UPnP compliant devices in the network 20. At a later time, the user 40 may watch video content on a UPnP AV compliant television in the network 20. The user 40 may access the media server component 100 of the application 15 using a user interface provided by the UPnP AV compliant television. The availability of the bookmarked internet multimedia content may be indicated to the user 40 by the media server component 100, and/or the user 40 may select a specific bookmark to view the associated multimedia content on the UPnP AV compliant television. In response to selection of the specific bookmark, the UPnP AV compliant television may request the associated multimedia content from the media server component 100 of the application. The application 15 may request the associated multimedia content from a content source that provides the multimedia content associated with the bookmark. The application 15 may receive the multimedia content associated with the bookmark from the content source. The transcoding engine 90 may transcode, may reformat and/or may repurpose the multimedia content for compatibility with the UPnP AV compliant television. The application 15 may begin transmitting the transcoded, reformatted and/or repurposed multimedia content to the UPnP AV compliant television for rendering as the transcoding engine 90 transcodes, reformats and/or repurposes the multimedia content.

The media server component 100 may receive request messages from the target rendering device which may request the transcoded, reformatted and/or repurposed internet multimedia content. The request messages from the target rendering device may request specific portions of the transcoded, reformatted and/or repurposed internet multimedia content. The media server component 100 may receive instructions from the transcoding engine 90 and/or from other components of the application 15. The instructions may direct the media server component 100 to transmit the transcoded, reformatted and/or repurposed internet multimedia content. The instructions may direct the media server component 100 to transmit specific portions of the transcoded, reformatted and/or repurposed internet multimedia content. In response to the request messages and/or the instructions, the media server component 100 may transmit the transcoded, reformatted and/or repurposed internet multimedia content and/or the specific portions to the target rendering device.

In an embodiment, the application 15 may be a self-contained software application for a personal computer, a laptop personal computer, a PDA, a mobile phone and/or another computing device which is capable of running software applications. In another embodiment, the application 15 may be a "plug-in" to an existing web browser. As known to one having ordinary skill in the art, a "plug-in" may be a secondary application that interacts with a host application to provide additional functions to the host application. If the application 15 may be a "plug-in," the application 15 may have the enhanced multimedia user interface 80, the transcoding engine 90, the media server component 100, the RDC component 110 and/or the content management component 120. The application 15 may connect to an existing web browser which may support a standard plug-in architecture as known to one having ordinary skill in the art. For example, the application 15 may connect as a "plug-in" to a web browser of Internet Explorer (trademark of Microsoft Corp.), Firefox (trademark of Mozilla Foundation), Opera (trademark of Opera Software ASA Norway), Google Chrome (trademark of Google Inc.) and/or the like.

The multimedia content object, such as, for example, the internet multimedia content and/or the multimedia content files stored in the network 20, may have the DRM protection. The DRM protection may make the multimedia content object subject to the restrictions for transfer and/or rendering. The restrictions may vary with the DRM protection and/or with a specific content license which a content provider may have created for the multimedia content. For example, the DRM protection may restrict rendering of the multimedia content object to a specific user and/or to a specific rendering device. The DRM protection may allow unlimited rendering of the multimedia content object, may allow the multimedia content object to be rendered only a limited number of times and/or may allow the multimedia content object to be rendered only during a certain time interval. The DRM protection may allow rendering only on a specific type and/or class of rendering device. The DRM protection may prohibit transmittal to and/or rendering by one or more rendering devices in the network 20. The DRM protection may allow transmittal to and/or rendering by one or more rendering devices in the network 20 but may impose conditions for the transmittal to and/or the rendering by the one or more rendering devices in the network 20. For example, the DRM protection may require a specific type of secure transfer of the content to be used when content is redirected to the target rendering device. The present invention is not limited to a specific embodiment of the DRM protection.

In a first example, the application 15 may encounter internet multimedia content protected by a first DRM protection such that the restrictions allow the user 40 of the application 15 to access, to view and/or to consume the internet multimedia content in a web browser on a specific personal computer. The first DRM protection may allow the user 40 of the application 15 to render the internet multimedia content on an external rendering device if transfer of the internet multimedia content is protected by Digital Transmission Content Protection ("DTCP"). The first DRM protection may define specific compliance rules associated with a DTCP-protected transfer. The user 40 may request the application 15 to render the internet multimedia content on the external rendering device. The application 15 may examine the first DRM protection of the internet multimedia content to determine that the user 40 may be allowed to render the internet multimedia content on the external rendering device. The application 15 may examine the DRM protection for the internet multimedia content to determine that a DTCP-protected export may be required. The application 15 may determine the capabilities of the target rendering device to determine that the target rendering device supports transfer of DTCP-protected content. The application 15 may establish a DTCP-protected channel between the application 15 and the target rendering device which may meet known compliance rules for DTCP-protected export for the first DRM protection. The application 15 may transfer the internet multimedia content to the target rendering device using the DTCP-protected channel.

In a second example, the application 15 may encounter internet multimedia content protected by a second DRM protection. The second DRM protection may prohibit use, display and/or rendering of the internet multimedia content on devices other than personal computers and mobile devices. The application 15 may examine the second DRM protection for the internet multimedia content to determine specific devices and/or device types on which rendering may be allowed. The application 15 may examine a list of the available rendering devices and/or the capabilities of the available rendering devices to determine the available rendering devices for which the second DRM protection may allow rendering of the of the internet multimedia content. For this example, the application 15 may determine that a specific laptop computer and a specific mobile device are the available rendering devices which fulfill the restrictions of the second DRM protection. The application 15 may provide and/or may display "Redirect" options corresponding to the specific laptop computer and the specific mobile device in the enhanced multimedia controls associated with the internet multimedia content. Thus, the application 15 may allow the user 40 to render the internet multimedia content having the second DRM protection to the available rendering devices for which transfer to and/or rendering of the multimedia content object may be allowed under the second DRM protection.

In a third example, the application 15 may encounter internet multimedia content protected by a third DRM protection. The third DRM protection may allow a specific user unlimited rights to render the internet multimedia content on devices owned by the specific user. The third DRM protection may not have rules, restrictions or policies regarding transfer of the internet multimedia content to a location outside of the web browser. Based on the third DRM protection, the application 15 may determine that the internet multimedia content may rendered by the devices owned by the specific user. Based on the list of the available rendering devices and/or the capabilities of the available rendering devices, the application 15 may determine which of the available rendering devices may be capable of rendering the internet multimedia content. The application 15 may provide and/or may display "Redirect" options corresponding to the available rendering devices capable of rendering the internet multimedia content. For example, the application 15 may provide and/or may display the "Redirect" options in the enhanced multimedia controls associated with the internet multimedia content. Thus, the application 15 may allow the user 40 to render the internet multimedia content having the third DRM protection to the available rendering devices for which transfer to and/or rendering of the multimedia content object may be allowed under the third DRM protection. The application 15 may control the rendering to follow the rules, the restrictions and/or the policies associated with the third DRM protection.

In a fourth example, the application 15 may encounter internet multimedia content protected by a fourth DRM protection. The policies of the fourth DRM protection may require the internet multimedia content protected by the fourth DRM protection to be rendered by a specific multimedia player provided by the content provider. Based on the policies of the fourth DRM protection, the application 15 may determine that "Redirect" options are not allowed for the internet multimedia content protected by the fourth DRM protection. The application 15 may not provide and/or may not display the "Redirect" options in the enhanced multimedia controls associated with the internet multimedia content. The application 15 may display a symbol, an icon and/or a notification message in the enhanced multimedia controls to inform the user 40 that the "Redirect" options are not available due to the fourth DRM protection of the internet multimedia content.

The preceding examples generally illustrate how the application 15 may determine which of the available rendering devices in the network 20 may render internet multimedia content based on the DRM protection associated with the internet multimedia content. The application 15 may examine the DRM protection of the internet multimedia content to determine whether the enhanced multimedia option "Record" may be allowed for the internet multimedia content. The application 15 may provide and/or may display the enhanced multimedia option "Record" in the enhanced multimedia controls if the application 15 determines that the DRM protection allows storage of a local copy of the internet multimedia content in the network 20.

The internet multimedia content may be protected by an implicit legal agreement. As known to one having ordinary skill in the art, the legal agreement may be terms of use. The user 40 of the application 15 may implicitly agree to be bound by the terms of use when the user 40 accesses, browses, and/or retrieves the internet multimedia content from a webpage. Typically, the terms of use may be accessible to users of the webpage and may be a legal agreement readable by the user 40. Thus, the application 15 may not be capable of directly accessing, reading, interpreting and/or applying the terms of use.

An embodiment of the application 15 may encourage the user 40 to read and/or to follow the terms of use. The application 15 may parse and/or may examine the webpage and/or the internet multimedia content to identify a displayed link that may provide the terms of use. If the application 15 identifies the terms of use, such as, for example, by identifying the displayed link, the application 15 may provide and/or may display a "Terms of Use" control. For example, the application 15 may display the "Terms of Use" control in the enhanced multimedia controls associated with the internet multimedia content. If the user 40 selects the "Terms of Use" control, the application 15 may display a message that may indicate that the webpage and/or the internet multimedia internet content has the terms of use. The message may indicate responsibility of the user 40 to respect the terms of use for rendering and/or recording the internet multimedia content using the enhanced multimedia controls of the application 15.

The application 15 may provide access to the terms(of use so that the user 40 may examine, may read, may understand and/or may follow the terms of use. The application 15 may enable and/or may require the user 40 to indicate that the user 40 has read the terms of use and/or that the user 40 agrees to abide by the terms of use when using the enhanced multimedia controls of the application 15. If the user 40 indicates that the user 40 has read the terms of use and/or that the user 40 agrees to abide by the terms of use, the application 15 may remove the "Terms of Use" control from the enhanced multimedia controls associated with the internet multimedia content. If different internet multimedia content and/or a different webpage are accessed, the application may provide and/or may display the "Terms of Use" control.

In an embodiment, the application 15 may not allow rendering and/or recording of the internet multimedia content by the user 40 until the user 40 indicates agreement to the terms of use associated with the internet multimedia content. The user 40 may indicate agreement generally, such as, for example, during a first use of the application 15 and/or without regard to the specific webpage, and/or may indicate agreement for each unique webpage accessed by the user 40.

In an embodiment, the terms of use for the webpage and/or the internet multimedia content may be encoded to a machine-readable terms of use protocol which may be accessed by the application 15. The application 15 may restrict presentation and/or use of the enhanced multimedia controls of the application 15 in accordance with the machine-readable terms of use protocol. The machine-readable terms of use protocol may indicate properties and/or restrictions which may be associated with the terms of use for the webpage and/or the internet multimedia content. The properties and/or the restrictions may be, for example, whether the internet multimedia content may be stored using the enhanced multimedia option "Record," whether the user 40 may share local copies of the internet multimedia content, whether the internet multimedia content may be transferred to other rendering devices using the "Redirect" option, whether the internet multimedia content may be transcoded for rendering, whether the internet multimedia content may be reformatted for rendering and/or the like. For each of the properties and/or the restrictions, the application 15 may determine if the property and/or the restriction is "Yes," "No," or "Not Indicated."

The machine-readable terms of use protocol may indicate other allowed uses and/or usage restrictions for the internet multimedia content. The other allowed uses and/or usage restrictions may be indicated in the terms of use for the webpage. For example, the machine-readable terms of use protocol may indicate specific rendering device types and/or properties restricted for the "Redirect" option. For example, the terms of use for a webpage may allow rendering on a television but may limit an allowed display size. The present invention is not limited to a specific embodiment of the terms of use, representation of the terms of use by the application 15 or encoding of the machine-readable terms of use protocol.

Figure 8:
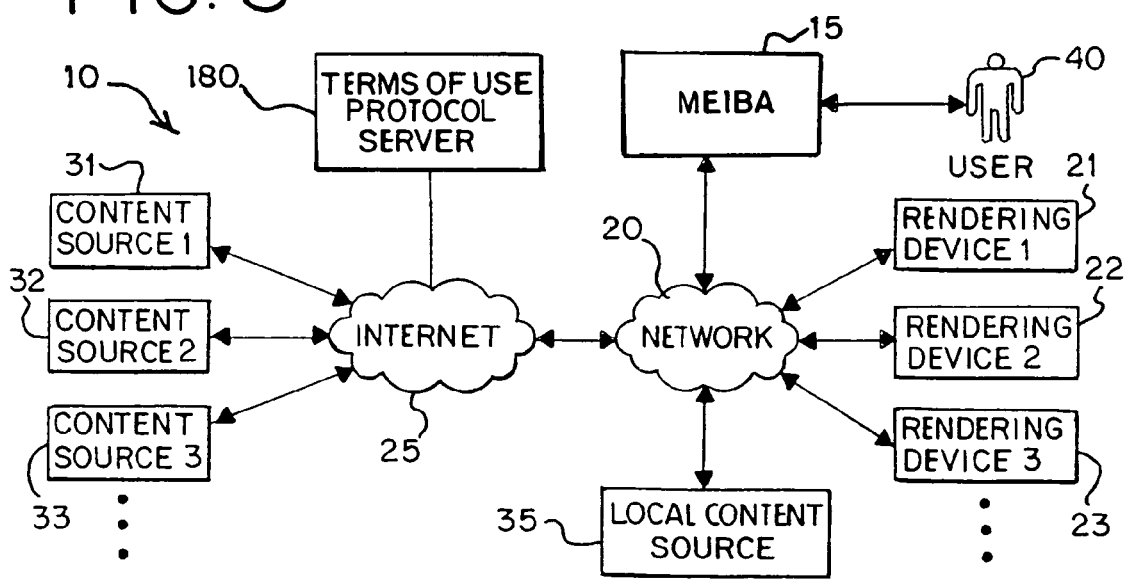
FIG. 8 illustrates a system for managing and/or rendering internet multimedia content in a network in an embodiment of the present invention.

The machine-readable terms of use protocol may be provided by the webpage and/or may be delivered to the application 15 with the internet multimedia content associated with the webpage. Alternatively, as generally illustrated in FIG. 8, the machine-readable terms of use protocol may be available from a terms of use server 180 which may be accessible by the application 15 using the network 20 and/or the internet 25. The internet content sources 31, 32, 33 may be different sources of the internet multimedia content. Each of the internet content sources 31, 32, 33 may have corresponding terms of use. Each of the internet content sources 31, 32, 33 may use a standard web browser to provide the terms of use which may be the legal agreement readable by the user 40. Each of the content sources 31, 32, 33 may provide different machine-readable terms of use protocols. The machine-readable terms of use protocols may be collected and/or stored on the terms of use server 180. The terms of use server 180 may store a table which may associate the machine-readable terms of use protocols with corresponding webpages.

In an embodiment, one or more of the internet content sources 31, 32, 33 may not provide the machine-readable terms of use protocol. A third party provider may access the webpage to obtain the terms of use which may be the legal agreement readable by the user 40. The third party provider may use the terms of use which may be the legal agreement readable by the user 40 to prepare the machine-readable terms of use protocol. The third party provider may transfer the machine-readable terms of use protocol to the terms of use server 180, and/or the third party provider may store the machine-readable terms of use protocol on the terms of use server 180. Thus, the application 15 may access and/or may use the machine-readable terms of use protocols for various webpages which may correspond to the terms of use and/or the legal agreements readable by the user 40.

An embodiment of the application 15 may encounter the internet multimedia content on a webpage. The application 15 may contact the terms of use server 180 to determine if the machine-readable terms of use protocol may be available for the webpage. The application 15 may retrieve the machine-readable terms of use protocols corresponding to the webpage. The application 15 may parse and/or may examine the machine-readable terms of use protocol to ensure that the terms of use for the webpage are followed by the application 15. For example, the application 15 may conform presentation, display and/or use of the enhanced multimedia controls to the terms of use.

The application 15 may determine that the machine-readable terms of use protocol may be unavailable for the webpage. If the machine-readable terms of use protocol may be unavailable, the application 15 may display the "Terms of Use" control in the enhanced multimedia controls of the application 15. The terms of use server 180 may record failed attempts to retrieve the machine-readable terms of use protocol. An operator of the terms of use server 180 may investigate webpages corresponding to the failed attempts so that the machine-readable terms of use protocols may be obtained, created and/or stored by the terms of use server 180.

Advertising content may be associated with the internet multimedia content. The advertising content may have and/or may be image content, video content, audio content, graphics, animations, video clips, text, web formatting, links to URLs and/or the like. The advertising content may be displayed with and/or in the active video object 130 and/or the active image object 150. For example, the advertising content may be video content displayed in the active video object 130 before display of the internet multimedia content, as known to one having ordinary skill in the art as a "pre-roll" advertisement. As another example, the advertising content may be video content displayed in the active video object 130 at various times during rendering of the internet multimedia content. Thus, the advertising content may interrupt the internet multimedia content for "commercial breaks."

Alternatively, the advertising content may be displayed in the web content 125 which may be located outside of the active video object 130 and/or the active image object 150. For example, the advertising content may be an image and/or a link to an associated URL. The image and/or the link may be displayed in the web content adjacent to the active video object 130. The advertising content and presentation of the advertising content are not limited to the examples presented herein, and the advertising content may be any advertising content known to one having ordinary skill in the art.

The application 15 may detect and/or identify the advertising content. For example, a source of the internet multimedia content, a source of the advertising content and/or a third party may provide machine-readable tags which may identify the advertising content. The machine-readable tags may be delivered as part of the advertising content and/or the internet content 125. Alternatively, the machine-readable tags may be available on a server accessible to the application 15 using the internet 25. The server may provide the machine-readable tags in response to a request from the application 15.

The machine-readable tags may enable the application 15 to distinguish the advertising content from non-advertising portions of the internet multimedia content and/or the internet content 125. Further, the machine-readable tags may indicate requirements for processing, displaying, rendering and/or controlling rendering of the advertising content when the internet multimedia content is transmitted to and/or rendered by one or more of the available rendering devices in the network 20. The machine-readable tags may indicate the requirements for processing and/or recording the advertising content when the internet multimedia content is recorded by the application 15.

The application 15 may ensure that the advertising content is displayed to the user 40 when the internet multimedia content is transmitted to and/or rendered by one or more of the available rendering devices in the network 20. Further, the application 15 may transcode, may reformat and/or may repurpose the advertising content to effectively and/or appropriately display the advertising content on one or more of the available rendering devices in the network 20.

As a first example, the application 15 may identify advertising content having an animated Graphics Interchange Format ("GIF") image displayed in the internet content 125 adjacent to the active video object 130 in the browser user interface 50 of the application 15. If the user 40 transmits the internet multimedia content associated with the active video object 130 to a DLNA-compliant television in the network 20, the application 15 may transcode and/or may reformat the animated GIF image to generate a short video advertisement appropriate for display on the DLNA-compliant television. The application 15 may transmit the short video advertisement to the DLNA-compliant television before transmittal of the internet multimedia content to the DLNA-compliant television. The DLNA-compliant television may render the short video advertisement as a "pre-roll" advertisement before rendering the internet multimedia content. Identification of the advertising content and/or conversion of the advertising content to the short video advertisement may be based on machine-readable tags that may be associated with the advertising content.

As a second example, the application 15 may identify video advertising segments displayed in the active video object 130 in the browser user interface 50 of the application 15. For example, the application 15 may identify video advertising segments. Each of the video advertising segments may have a twelve second duration, for example. The video advertising segments may be displayed as "commercial breaks" at known times T1, T2 and T3 during display of the internet multimedia content in the active video object 130. If the internet multimedia content is transmitted to one or more of the available rendering devices in the network 20, the application 15 may ensure that the video advertising segments are transmitted to and/or rendered by the rendering device in the network 20 at the known times T1, T2 and T3. The application 15 may disable some or all of the playback controls during rendering of the video advertising segments. For example, the application 15 may not allow the user to pause, to fast forward or to seek forward during rendering of the video advertising segments. The application 15 may not allow the user to view, to access and/or to seek to a portion of the internet multimedia content before viewing and/or rendering of a preceding video advertising segment. Identification of the advertising content and/or disabling of the playback controls may be based on machine-readable tags that may be associated with the advertising content.

As a third example, the application 15 may identify advertising content having an advertising image associated with advertising text displayed in the internet content 125 on the same webpage as the active video object 130. The user 40 may use the enhanced multimedia controls 200 to select the enhanced multimedia option "Record" for the internet multimedia content associated with the active video object 130. For example, the internet multimedia content may be recorded as a digital multimedia content file stored on the local server. In an embodiment, the application 15 may transcode, may repurpose and/or may reformat the advertising content for inclusion in the digital multimedia file stored on the local server. For example, the digital multimedia file may be a video file which displays the advertising image for the first five seconds, displays the advertising text for the next five seconds, and displays the internet multimedia content for a remainder of the digital multimedia file. Identification of the advertising content and/or inclusion of the advertising content in the digital multimedia file stored on the local server may be based on machine-readable tags associated with the advertising content.

FIG. 9 generally illustrates a flowchart of a method 300 for rendering internet multimedia content and/or locally stored multimedia content in a network in an embodiment of the present invention. As generally shown at step 301, the application 15 may determine availability and/or capabilities of the available rendering devices in the network 20 such as, for example, the rendering devices 21, 22, 23. For example, the RDC component 110 may determine the availability and/or the capabilities of the available rendering devices in the network 20. The application 15 may create, may maintain and/or may update an internal list of the available rendering devices in the network 20. The internal list may have the capabilities of the available rendering devices. For example, the RDC component 110 may create, may maintain and/or may update the internal list.

As generally shown at step 305, the application 15 may enable the user 40 to search for and/or retrieve the internet multimedia content. The application 15 may search for and/or may retrieve the internet multimedia content based on user input provided by input means associated with the device on which the application 15 resides. For example, the browser user interface 50 may accept the user input and/or may retrieve and render the internet multimedia content. The application 15 may retrieve the internet multimedia content from remote servers, such as, for example, the internet content sources 31, 32, 33. For example, the web browser application 60 may retrieve the internet multimedia content from the remote servers. The internet multimedia content may be rendered by the application 15, such as, for example, by the browser user interface 50 and/or the multimedia player 70.

As generally shown at step 310, the application 15 may determine the enhanced multimedia options appropriate for the internet multimedia content and/or the available rendering devices. Determination of the enhanced multimedia options appropriate for the internet multimedia content and/or the available rendering devices may be based on the properties and/or the restrictions of the internet multimedia content and/ or the capabilities of the available rendering devices. As generally shown at step 315, the application 15 may provide and/or may display the enhanced multimedia options appropriate for the internet multimedia content and/or the available rendering devices. For example, the enhanced multimedia user interface 80 may display the enhanced multimedia options appropriate for the internet multimedia content and/ or the available rendering devices.

As generally shown at step 320, the user 40 may select one of the "Redirect" options. The selected "Redirect" option may correspond to one or more of the available rendering devices, such as, for example, one or more of the rendering devices 21, 22, 23. As generally shown at step 325, the application 15 may process the internet multimedia content to prepare the internet multimedia content for delivery to the target rendering device. For example, the transcoding engine 90 may process the internet multimedia content. The application 15 and/or the transcoding engine 90 may transcode and/or may reformat the internet multimedia content based on the capabilities of the target rendering device.

As generally shown at step 330, the application 15 may transmit the transcoded, reformatted and/or repurposed internet multimedia content to the target rendering device using the network 20. For example, the media server component 100 may receive the transcoded, reformatted and/or repurposed internet multimedia content from the transcoding engine 90. The media server component 100 may transmit the transcoded, reformatted and/or repurposed internet multimedia content to the target rendering device using the network 20. The media server component 100 may store and/or may buffer a portion and/or an entirety of the transcoded, reformatted and/or repurposed internet multimedia content received from the transcoding engine 90.

As generally shown at step 335, the target rendering device may render the internet multimedia content. For example, the target rendering device may render the transcoded, reformatted and/or repurposed internet multimedia content received from the media server component 100. The application 15 may enable the user 40 to control the rendering by the target rendering device. The application 15 may discontinue rendering of the internet multimedia content within the browser user interface 50. Alternatively, the application 15 may continue to render the internet multimedia content within the browser user interface 50 in approximate synchronization with rendering of the active content object by the target rendering device.

As generally shown at step 340, the application 15 may enable the user 40 to search for and/or retrieve different internet multimedia content. In an embodiment, the application 15 may terminate the rendering of the internet multimedia content on the target rendering device in response to navigation from the webpage having and/or providing the internet multimedia content. In another embodiment, the application 15 may continue to render the internet multimedia content on the target rendering device. The application 15 may display and/or may continue to display rendering controls so that the user 40 may continue to control the rendering of the internet multimedia content by the target rendering device.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for rendering internet multimedia content in a network connected to the internet wherein a rendering device is connected to the network, the method comprising the steps of:

retrieving a first webpage from a remote content source via the internet wherein a first device connected to the network retrieves the first webpage from the remote content source and further wherein the first device is a different device than the rendering device;

displaying the first webpage in a user interface provided by the first device wherein the first webpage provides access to the internet multimedia content;

retrieving the internet multimedia content from the internet using network wherein the internet multimedia content is retrieved from the internet based on user input accepted by the user interface provided by the first device;

transmitting the internet multimedia content to the rendering device;

transcoding the internet multimedia content before transmitting the internet multimedia content to the rendering device wherein transcoding of the internet multimedia content is based on capabilities of the rendering device; and rendering the internet multimedia content on the rendering device wherein rendering by the rendering device is controlled by the first device.

2. The method of claim 1 further comprising the step of:
rendering the internet multimedia content in the user interface in substantial synchronization with rendering of the internet multimedia content by rendering device.

3. A non-transitory computer-readable medium having program instructions for rendering internet multimedia content in a network connected to the internet wherein a rendering device is connected to the network wherein execution of the program instruction by a first device connected to the network causes the first device to perform the steps of:
detecting that the rendering device is connected to the network;
determining capabilities of the rendering device;
displaying a webpage associated with the internet multimedia content wherein a user interface on the first device displays the webpage and further wherein the user interface presents control options for the internet multimedia content in the webpage wherein the internet multimedia content is selected using the webpage and further wherein the control options are based on properties of the internet multimedia content and the capabilities of the rendering device and further wherein the user interface accepts user input selecting at least one of the control options;
transcoding the internet multimedia content to generate transcoded internet multimedia content in response to the user input wherein the transcoded internet multimedia content is based on the capabilities of the rendering device; and
transmitting the transcoded internet multimedia content to the rendering device.

4. The computer-readable medium of claim 3 further comprising instructions for the first device to perform the step of:
installing a plug-in application that connects to a primary application executed by the first device and further wherein the primary application provides a web browser used to retrieve the webpage wherein execution of the plug-in application enables the first device to detect that the rendering device is connected to the network, determine the capabilities of the rendering device, display the control options, transcode the internet multimedia content, and transmit the transcoded internet multimedia content to the rendering device.

5. The computer-readable medium of claim 3 further comprising instructions for the first device to perform the step of:
providing a web browser used to retrieve the webpage from a remote content source via the internet.

6. The computer-readable medium of claim 3 further comprising instructions for the first device to perform the step of:
rendering the internet multimedia content on the first device.

7. The computer-readable medium of claim 3 further comprising instructions for the first device to perform the step of:
determining a restriction for the internet multimedia content wherein a server accessible using the internet provides the restriction and further wherein the internet multimedia content is transmitted to the rendering device if transmittal to the rendering device complies with the restriction.

8. The computer-readable medium of claim 3 further comprising instructions for the first device to perform the step of:
indicating availability of the internet multimedia content to a second device connected to the network that is a different device than the first device.

9. The computer-readable medium of claim 3 further comprising instruction for the first device to perform the step of:
creating a playlist that has the internet multimedia content and multimedia content files stored in a server connected to the network wherein the internet multimedia content and the multimedia content files stored in the server are rendered in response to selection of the playlist.

10. The computer-readable medium of claim 3 further comprising instructions for the first device to perform the step of:
generating the transcoded internet multimedia content to conform to a digital rights management protection associated with the internet multimedia content.

11. The computer-readable medium of claim 3 further comprising instructions for the first device to perform the step of:
transmitting a first message to the first rendering device in response to the user input and further wherein the first rendering device transmits a second message to the first device in response to the first message further wherein the second message requests transmittal of the transcoded Internet multimedia content to the first rendering device.

* * * * *